United States Patent
Kobana

(10) Patent No.: US 11,553,095 B2
(45) Date of Patent: Jan. 10, 2023

(54) INFORMATION PROCESSING APPARATUS, CONTROL METHOD OF INFORMATION PROCESSING APPARATUSES, SCANNER APPARATUS, CONTROL METHOD OF SCANNER APPARATUS, AND RECORDING MEDIUM

(71) Applicant: CANON KABUSHIKI KAISHA, Tokyo (JP)

(72) Inventor: Yusuke Kobana, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/673,574

(22) Filed: Feb. 16, 2022

(65) Prior Publication Data
US 2022/0303400 A1    Sep. 22, 2022

(30) Foreign Application Priority Data

Mar. 22, 2021  (JP) .............................. JP2021-047077

(51) Int. Cl.
H04N 1/00  (2006.01)

(52) U.S. Cl.
CPC ......... *H04N 1/0044* (2013.01); *H04N 1/0023* (2013.01); *H04N 1/00228* (2013.01); *H04N 2201/0094* (2013.01)

(58) Field of Classification Search
CPC . H04N 1/0044; H04N 1/00228; H04N 1/0023
USPC ....................................................... 358/1.13
See application file for complete search history.

(56) References Cited

U.S. PATENT DOCUMENTS

| | | | | |
|---|---|---|---|---|
| 2002/0024685 A1* | 2/2002 | Sasaki | ............... | H04N 1/00411 358/402 |
| 2011/0122435 A1 | 5/2011 | Nishiyama | ................... | 358/1.15 |
| 2013/0235421 A1* | 9/2013 | Ono | ........................ | G06K 15/02 358/1.15 |
| 2013/0258405 A1* | 10/2013 | Tsuya | ................. | H04N 1/00241 358/1.15 |
| 2016/0201815 A1* | 7/2016 | Wang | .................... | F16K 15/205 137/231 |

FOREIGN PATENT DOCUMENTS

JP    2011-114491    6/2011

\* cited by examiner

*Primary Examiner* — Allen H Nguyen
(74) *Attorney, Agent, or Firm* — Venable LLP

(57) ABSTRACT

A client terminal that executes an application that can transmit both push scanning and pull scanning instructions to an MFP provided with a scanner apparatus has an acquisition unit that acquires an image to be used for a preview from the MFP by providing an instruction for pull scanning to the MFP if the input of a setting for performing a push scanning is received and a preview setting is further received, a provision unit that provides a preview screen by using the acquired image to be used for a preview; and a transmission unit that transmits a push scanning instruction to the MFP.

11 Claims, 21 Drawing Sheets

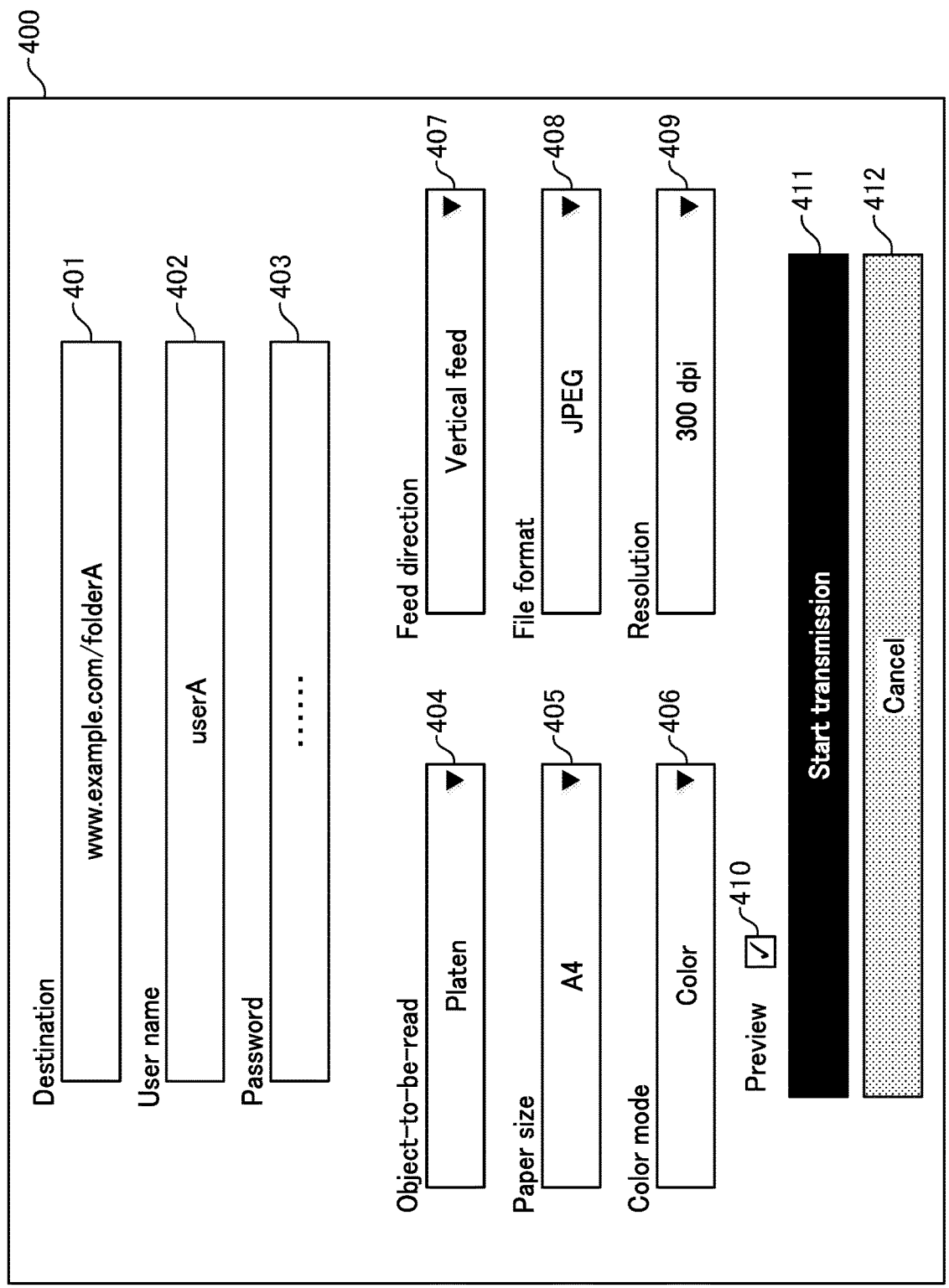

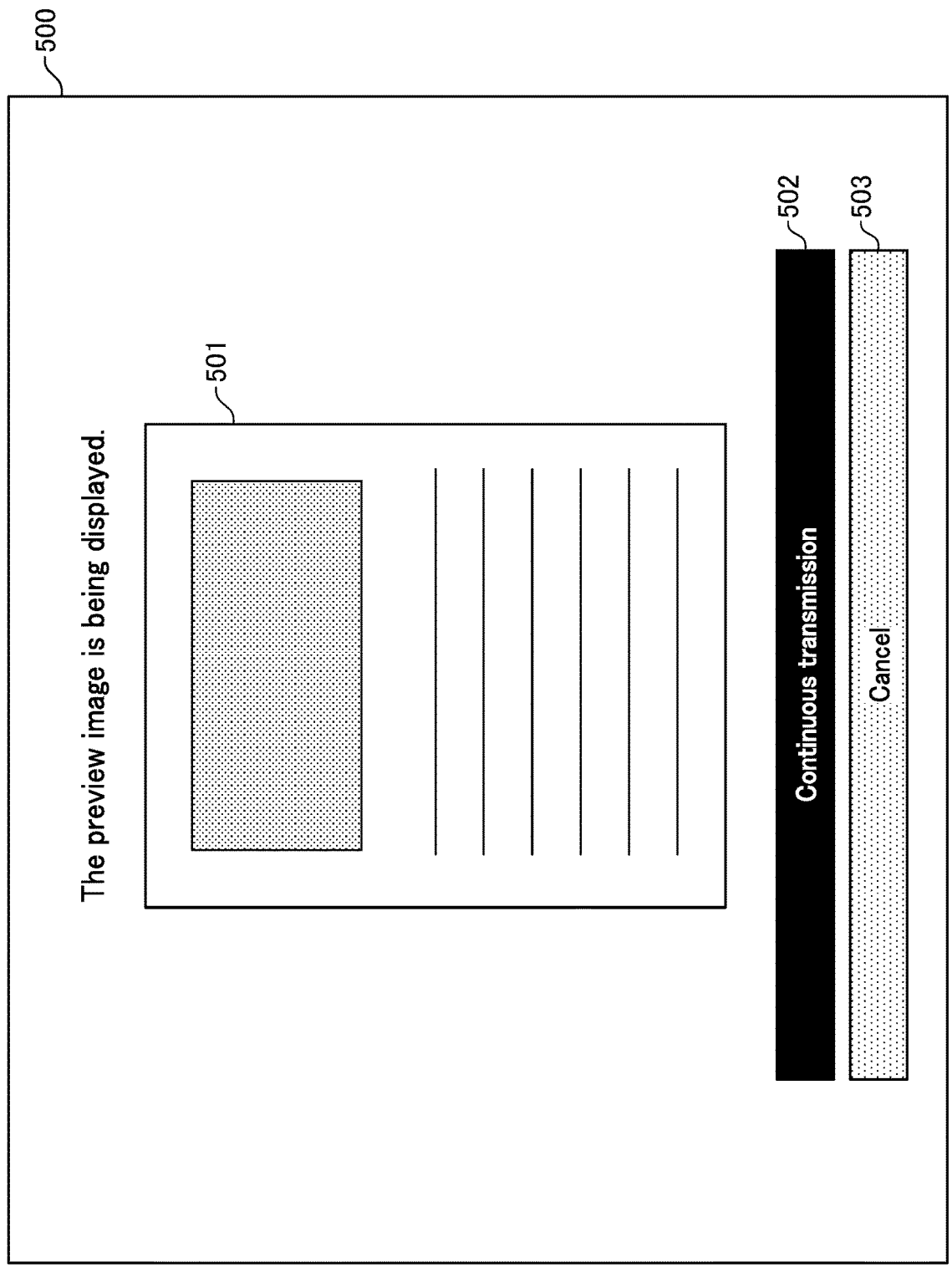

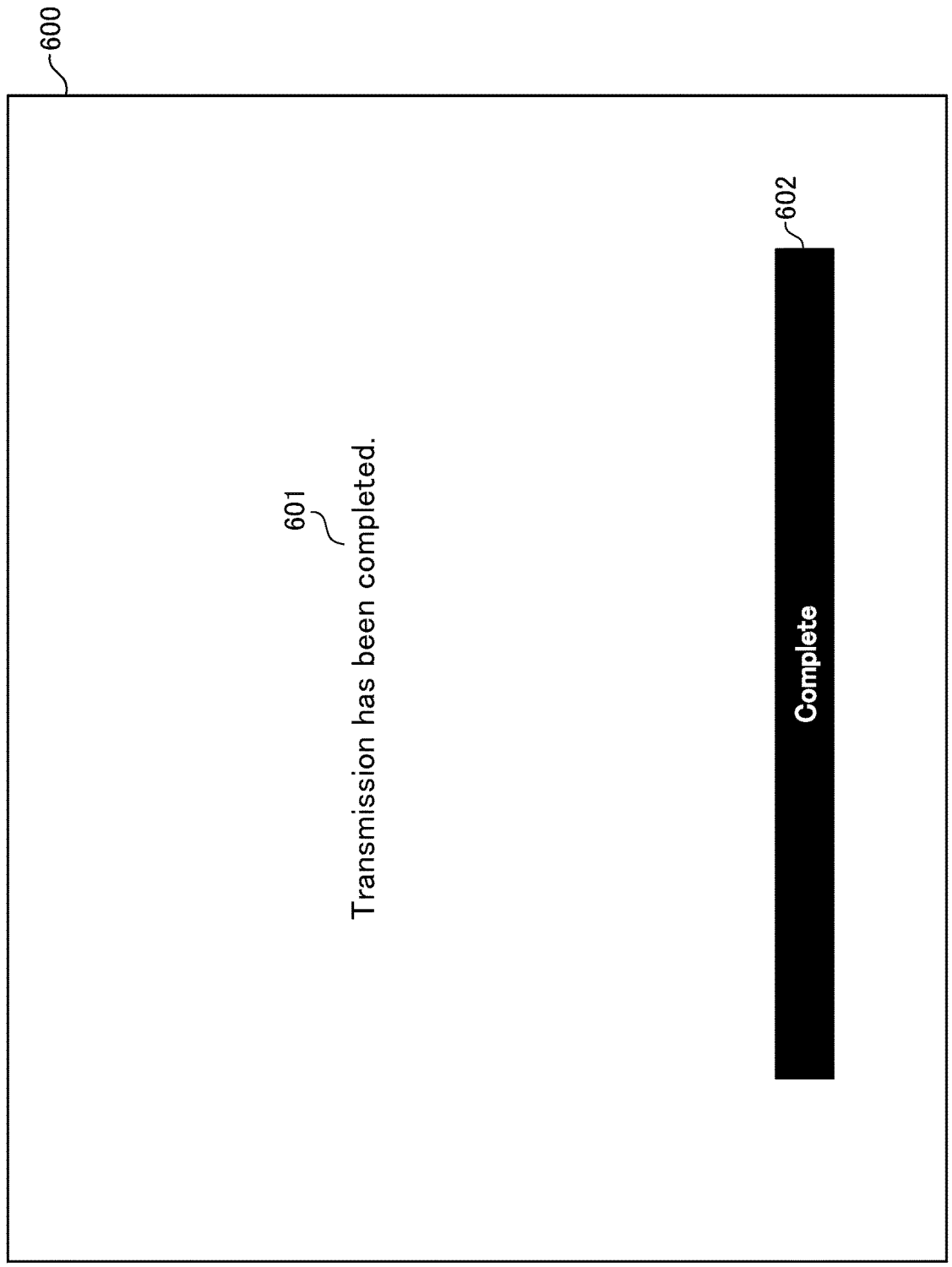

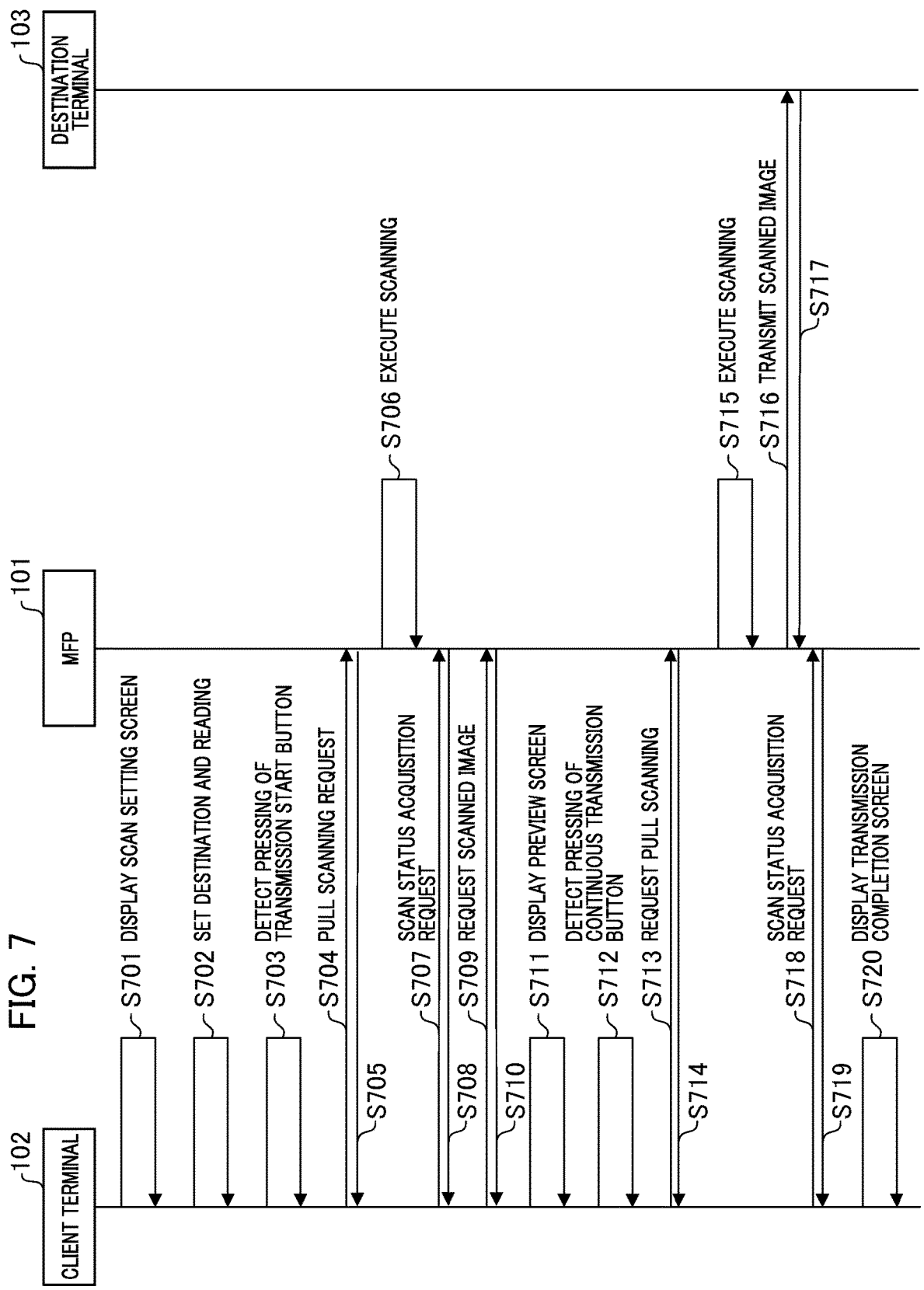

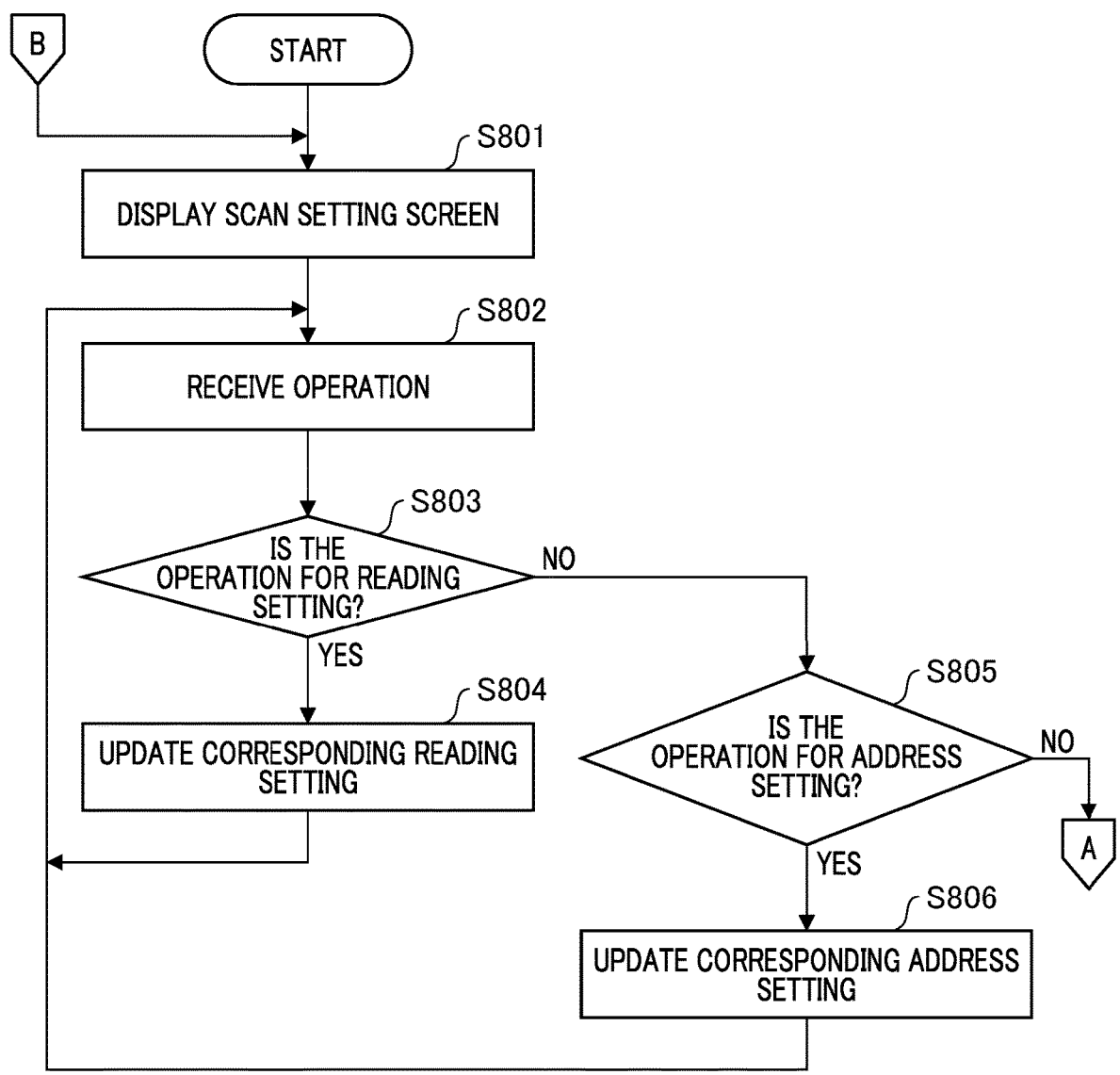

FIG. 11A

```
POST /ScanJob HTTP/1.1
Host:192.168.1.100
Content-Type: text/xml
Content-Length:272

<?xml version="1.0" encoding="UTF-8"?>
<ScanJob>
    <Source>Platen</Source>
    <Direction>ShortEdgeFeed</Direction>
    <Size>A4</Size>
    <Format>jpeg</Format>
    <ColorMode>Color</ColorMode>
    <Resolution>300</Resolution>
</ScanJob>
```

FIG. 11B

```
HTTP/1.1 201 Created
Location: http://192.168.1.100/ScanJob/1
```

FIG. 12A

HTTP/1.1 200 OK
Content-Type: text/xml
Content-Length:184

```
<?xml version="1.0" encoding="UTF-8"?>
<ScannerStatus>
    <State>Scanning</State>
    <ScanPage>1</ScanPage>
    <JobStatus>Processing</JobStatus>
</ScannerStatus>
```

FIG. 12B

HTTP/1.1 200 OK
Content-Type: text/xml
Content-Length:183

```
<?xml version="1.0" encoding="UTF-8"?>
<ScannerStatus>
    <State>Idle</State>
    <ScanPage>3</ScanPage>
    <JobStatus>Completed</JobStatus>
    <JobResult>Success</JobResult>
</ScannerStatus>
```

FIG. 13A

POST /ScanJob HTTP/1.1
Host:192.168.1.100
Content-Type: text/xml
Content-Length:454

```
<?xml version="1.0" encoding="UTF-8"?>
<ScanJob>
    <Source>Platen</Source>
    <Direction>ShortEdgeFeed</Direction>
    <Size>A4</Size>
    <Format>jpeg</Format>
    <ColorMode>Color</ColorMode>
    <Resolution>300</Resolution>
    <Destination>
        <Uri>http://www.example.com/folderA</Uri>
        <UserName>userA</UserName>
        <Password>123456</Password>
    </Destination>
</ScanJob>
```

FIG. 13B

HTTP/1.1 201 Created

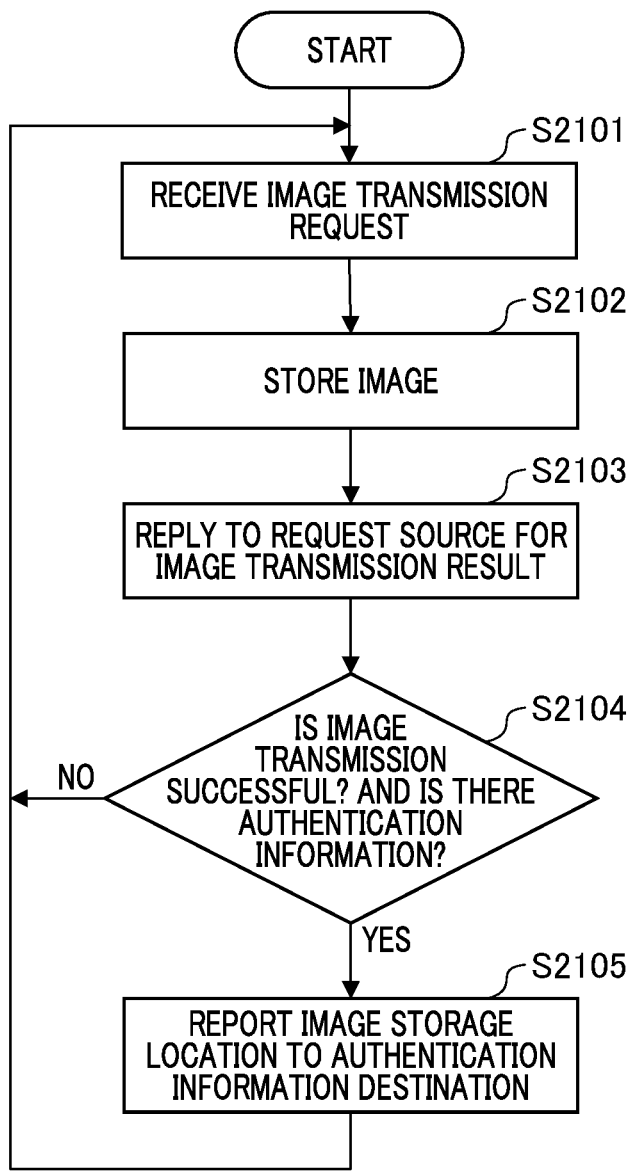

INFORMATION PROCESSING APPARATUS, CONTROL METHOD OF INFORMATION PROCESSING APPARATUSES, SCANNER APPARATUS, CONTROL METHOD OF SCANNER APPARATUS, AND RECORDING MEDIUM

BACKGROUND OF THE INVENTION

Field of the Invention

The present invention relates to an information processing apparatus corresponding to a preview of a scanned image during push scanning, a control method for the information processing apparatus, a scanner apparatus, a control method for the scanner apparatus, and a recording medium.

Description of the Related Art

A form of instructing an image processing apparatus to scan an original and transmit a scanned image to a specific destination is referred to as "push scanning". Push scanning instructions are not limited to those provided from an operation panel on the image processing apparatus and may also be provided from a client terminal connected on the network. In contrast, a form in which the client terminal instructs the image processing apparatus to scan an original and transmit a scanned image to the client terminal itself is referred to as "pull scanning".

There is also a method for transmitting a scanned image from the image processing apparatus to a specific destination (client terminal), in which the image processing apparatus transmits an event message that causes a client terminal of the transmission destination to perform pull scanning on the image processing apparatus. This form of scanning is referred to as "pseudo-push scanning". There is a preview function that serves a means for confirming the scanned image to be transmitted to the client terminal. Japanese Patent Application Laid-Open No. 2011-114491 discloses the preview function in which the scanned image is displayed on an image processing apparatus before the scanned image is transmitted to a client terminal when the preview of pseudo-push scanning is set in an image forming apparatus.

However, in the push scanning performed from the client terminal, because the scanned image is transmitted directly to the destination without passing through the client terminal, a user cannot confirm the image to be transmitted in advance. Additionally, if the user wants to confirm the scanned image after the transmission, the user needs to access the transmission destination each time for the confirmation of the image, which results in a time-consuming process.

SUMMARY OF THE INVENTION

The present invention provides an information processing apparatus that enables easy confirmation of scanned images when push scanning is performed.

An information processing apparatus of the present invention is an information processing apparatus that executes an application that can transmit both push scanning and pull scanning instructions to a scanner apparatus comprising: acquiring an image to be used for a preview from the scanner apparatus by providing an instruction for pull scanning to the scanner apparatus if an input of a setting for performing a push scanning is received and a preview setting is further received; providing a preview screen by using the acquired image to be used for a preview; and transmitting a push scanning instruction to the scanner apparatus according to the received input of the setting for performing a push scanning in response to the receipt of an operation for starting the push scanning after the preview screen is provided.

Further features of the present invention will become apparent from the following description of exemplary embodiments with reference to the attached drawings.

BRIEF DESCRIPTION OF THE DRAWINGS

FIG. 4 illustrates a scan setting screen according to the first embodiment.
FIG. 5 illustrates a preview screen according to the first embodiment.
FIG. 6 illustrates a transmission completion screen.
FIG. 7 illustrate a sequence of the scan process according to the first embodiment.
FIG. 8 is a flowchart showing a process of the client terminal according to the first embodiment.
FIGS. 11A and 11B illustrate an example of a pull scanning request and response.
FIGS. 12A and 12B illustrate an example of a response to a scan status acquisition request.
FIGS. 13A and 13B illustrate an example of a push scan request and response.
FIG. 21 is a flowchart showing a process of a destination terminal according to the third embodiment.

DESCRIPTION OF THE EMBODIMENTS

First Embodiment

As the first embodiment, a description will be given of a method for displaying a preview of a scanned image on the client terminal when the client terminal instructs the image processing apparatus to perform push scanning. It is assumed that an original to be scanned in the first embodiment is an original placed on a platen.

Figure 1:
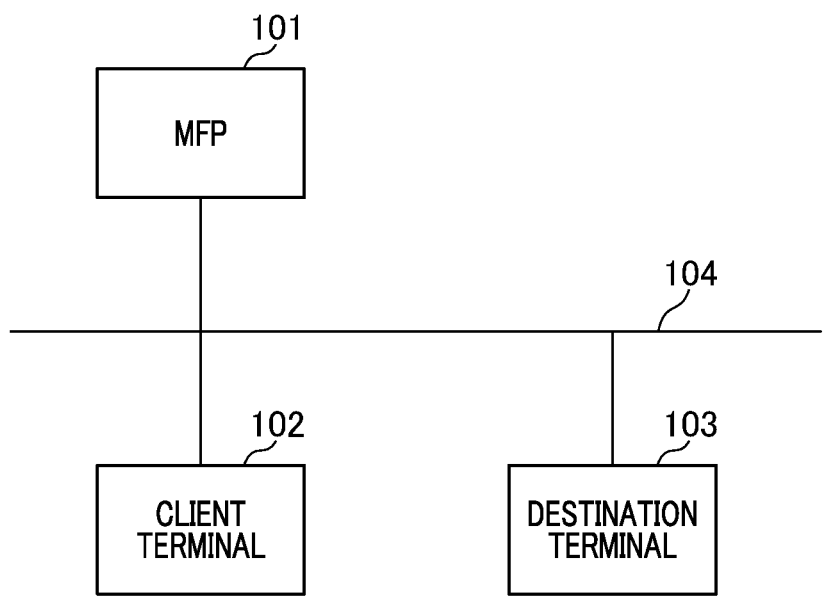
FIG. 1 illustrates an overall configuration of an image processing system.

First, a configuration example of an image processing system including an image processing apparatus having a scanning function according to the present embodiment will be described with reference to FIG. 1. FIG. 1 illustrates a configuration of the image processing system. The image processing system has an MFP 101, a client terminal 102, and a destination terminal 103, which are connected to each other via a network 104. The network 104 is a communication network capable of transmitting and receiving data. The communication network can be realized by any one of a LAN and a WAN using the Internet, a telephone line, a dedicated digital line, or a combination of these. In the present embodiment, a description will be given of an example in which the client terminal 102 instructs the MFP 101 to scan an original and transmit the scanned image to the destination terminal 103. The MFP 101 executes scanning in response to the instructions from the client terminal 102 and transmits the scanned image to the destination terminal 103.

The MFP 101 (Multi Function Peripheral) is a full-color image processing apparatus that uses, for example, an electrophotography method and has a copy function, a print function, and a scan function. The MFP 101 transmits the image read by a scanner to a specific destination terminal 103. In the present embodiment, although the MFP 101 will be described as an example of the image processing apparatus, the present invention is not limited thereto, and the image processing apparatus may be a scanner apparatus having a function of scanning and a function of transmitting scanned images.

The client terminal 102 and the destination terminal 103 are information processing apparatuses. The client terminal 102 is an information processing apparatus capable of displaying a screen including an image, and is, for example, a typical information processing terminal such as a PC and smartphone. Additionally, a scan application 320 (hereinafter, referred to as the "scan app") is installed on the client terminal 102 to instruct the scan apparatus (for example, the MFP 101) to perform scanning. The destination terminal 103 is, for example, an information processing apparatus, for example, a server apparatus that transmits and receives a file via a file transmission protocol represented by HTTP (Hyper Text Transfer Protocol) or performs user authentication as required. The destination terminal 103, which serves as the transmission destination of the scanned image in push scanning, may be realized by a virtual machine (cloud service) that uses resources provided by a data center that includes an information processing apparatus, in addition to the information processing apparatus.

Figure 2A:
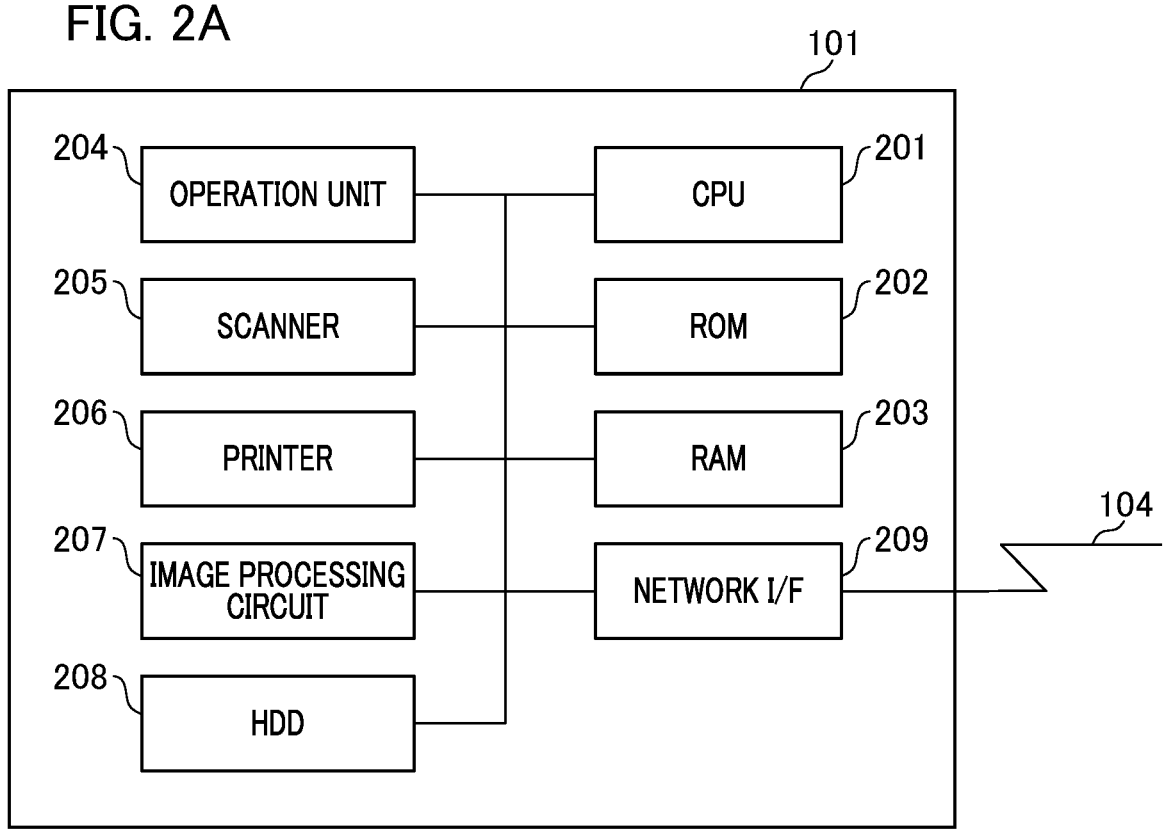
FIGS. 2A and 2B illustrate a configuration of an MFP.

Next, an example of a configuration of the MFP 101 will be described with reference to FIGS. 2A and 2B. FIG. 2A illustrates a hardware configuration of the MFP 101. The MFP 101 is provided with a CPU 201, a ROM 202, a RAM 203, an operation unit 204, a scanner 205, a printer 206, an image processing circuit 207, an HDD 208, and a network I/F 209.

The CPU (Central Processing Unit) 201 controls the entire MFP 101. The ROM (Read Only Memory) 202 stores a boot program and various control programs of the MFP 101. The RAM (Random Access Memory) 203 is used to serve as a temporary storage area of a main memory, a work area, and the like of the CPU 201. The CPU 201 executes the programs stored in the ROM 202 by using the memory of the RAM 203 to implement the function of the image processing apparatus 100.

The operation unit 204 receives operations, input, and instructions from a user and executes the user's operations. Additionally, the operation unit 204 displays a variety of information to the user. The operation unit 204 includes a display device, for example, a liquid crystal screen having a touch panel function, and a button board. The scanner 205 is a scanner apparatus that optically reads an original and generates image data (electronic file) based on the original that has been read. The scanner 205 outputs, as images, multi pages of original for each page in order. The printer 206 is a printing apparatus that forms an image according to print data received externally and outputs the image to a recording medium, for example, a sheet, or optically reads an original set in the scanner 205 and outputs the original to a recording medium, for example, a sheet.

The image processing circuit 207 has a large-volume image memory, an image rotation circuit, a resolution resizing circuit, an MH, an MR, an MMR, JBIG, JPEG, and the like, and can perform various image processing such as shading, trimming, and masking. The MFP 101 processes the images scanned by the scanner 205 in the image processing circuit 207. The HDD (hard disk drive) 208 is a large-volume storage medium that stores various data. The HDD 208 is connected by an interface, for example, SCSI (Small Computer System Interface) and IDE (Integrated Drive Electronics).

The network I/F 209 is an interface for connecting to the network 104. The network I/F 209 inputs and outputs various data including images to and from each device on the network 104, for example, the client terminal 102 and the destination terminal 103, via the network 104. The scanner 205, the printer 206, and the image processing circuit 207 are connected by a high-speed video bus that is different from the CPU bus from the CPU 201, and are configured to transmit images at a high speed.

Figure 2B:
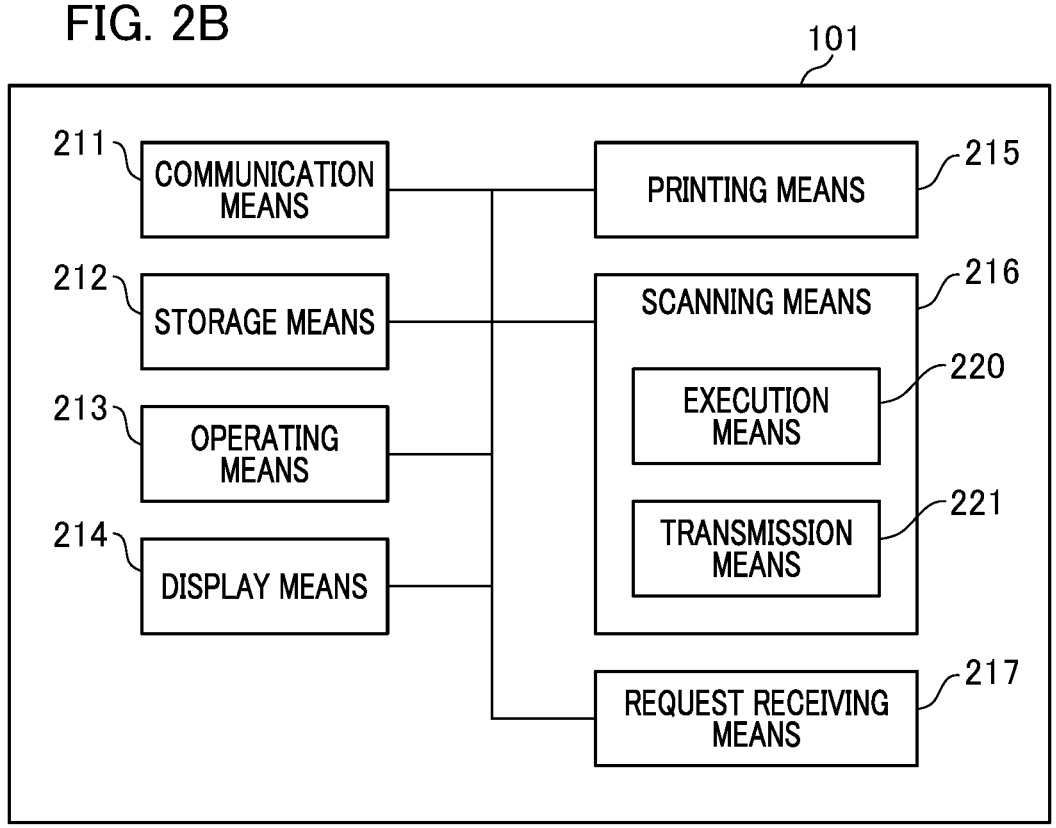

FIG. 2B illustrates a software configuration of the MFP 101. MFP 101 has a communication means 211, a storage means 212, an operating means 213, a display means 214, a printing means 215, a scanning means 216, and a request receiving means 217. The CPU 201 deploys the programs stored in the ROM 202 and the HDD 208 to the RAM 203, and executes them to function as the respective software modules shown in FIG. 2B.

The communication means 211 communicates with external devices such as the client terminal 102 and the destination terminal 103. For example, the communication means 211 receives requests transmitted from the client terminal 102 and transmits images to the destination terminal 103. The storage means 212 controls the storage regions of the ROM 202, the RAM 203, and the HDD 208. The operation means 213 receives the user's operations to the MFP 101. The display means 214 performs processing for displaying a variety of information on a display device of the operation unit 204.

The printing means 215 controls the printer 206 to perform the print processing. The printing means 215 performs the processing necessary for executing the print processing in response to a print job (print request) received from an external device or instructions from the user. The scanning means 216 controls the scan process. The scanning means 216 has an execution means 220 and the transmission means 221. The execution means 220 controls the scanner 205 to execute the scan process and generate a scanned image. A transmission means 221 transmits the scanned image and URI for acquiring the scanned image to a predetermined destination. Additionally, the transmission means 221 transmits the scan status to a request source that has requested to obtain the scan status.

The request receiving means 217 receives a request or an instruction from the external devices including the client terminal 102 via the communication means 211 and provides an instruction for the processing corresponding to the received request. The request receiving means 217 receives various requests including a push scan request, a pull scan request, a printing request, and a processing status confirmation request.

Figure 3A:
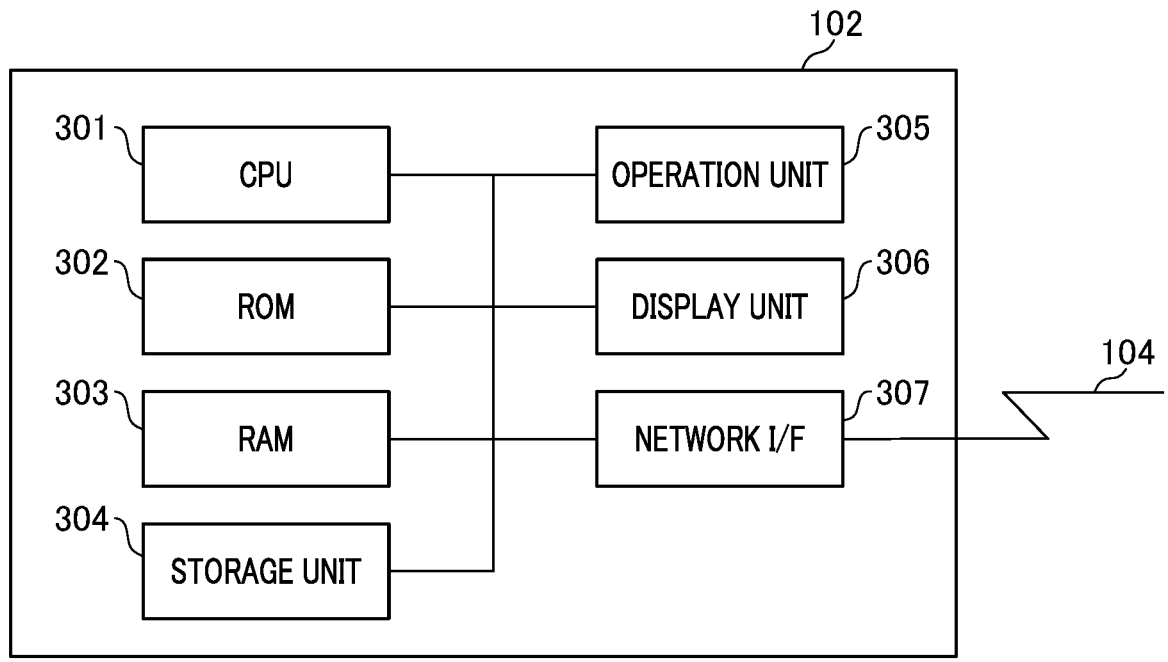
FIGS. 3A and 3B illustrate a configuration of a client terminal.

Next, an example of the configuration of the client terminal 102 will be described with reference to FIGS. 3A and 3B. FIG. 3A illustrates a hardware configuration of the client terminal 102. The client terminal 102 has a CPU 301, a ROM 302, a RAM 303, a storage unit 304, an operation unit 305, a display unit 306, and a network I/F 307.

The CPU 301 controls the entire client terminal 102. The ROM 302 stores a boot program and various control programs of the client terminal 102. The RAM 303 is used to serve as a temporary storage area of the main memory, the work area, and the like of the CPU 201. The CPU 301 executes a program stored in the ROM 302 by using the memory of the RAM 303 to execute various processing for controlling the operation of the client terminal 102.

The storage unit 304 is a storage medium that stores various programs and various data including image data. The operation unit 305 receives operations, inputs, and instructions from the user and transmits information that has been input by the user to the CPU 301. The operation unit 305 is, for example, a pointing device (for example, a mouse and a touch panel), an operation button, and a keyboard. The display unit 306 displays a variety of information to the user in response to the instructions from the CPU 301. The display unit 306 is, for example, a liquid crystal display and a touch panel. The operation unit 305 and the display unit 306 may be integrally configured to serve as a touch panel or the like.

The network I/F 307 is an interface for connecting to the network 104. The network I/F 307 inputs and outputs various data including images to and from each device on the network 104, for example, the MFP 101 via the network 104. It is assumed that the destination terminal 103 has the configuration of the typical information processing apparatus, as in the case of the client terminal 102.

Figure 3B:
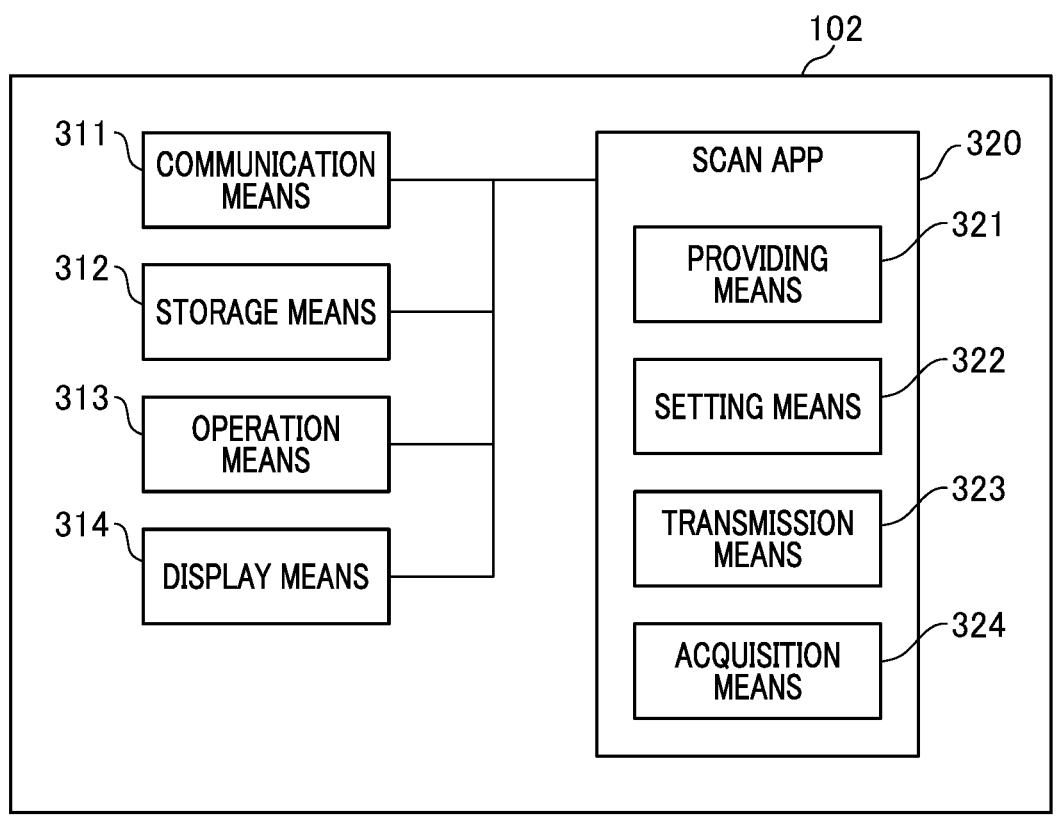

FIG. 3B illustrates a software configuration of the client terminal 102. The client terminal 102 has a communication means 311, a storage means 312, an operation means 313, a display means 314, and the scan app 320. The CPU 301 deploys programs stored in the ROM 302 and the storage unit 304 on the RAM 303 and executes them to function as each of the software modules shown in FIG. 3B.

The communication means 311 communicates with external devices such as the MFP 101. For example, the communication means 311 transmits a scan request to the MFP 101. The storage means 312 controls the storage regions of the ROM 302, the RAM 303, and the storage unit 304. The operation means 313 receives the user's operation on the client terminal 102. The display means 314 performs a process for displaying a screen on the display unit 306. A scan setting screen or a preview screen of a scanned image is provided on the display means 314 from the provision means 321 of the scan app 320, and the display means 314 displays the provided screen on the display unit 306.

The scan app 320 is an application that can transmit both push scanning and pull scanning instructions to the scanner apparatus. In this context, the push scanning is a form of scanning in which the client terminal 102 instructs the MFP 101 to scan the original and transmit the scanned image to a specific destination (destination terminal 103). The pull scanning is a form in which the client terminal 102 instructs the MFP 101 to scan the original and transmit the scanned image to the client terminal 102 itself.

The scan app 320 has the providing means 321, a setting means 322, a transmission means 323, and an acquisition means 324. The providing means 321 provides various screens related to scanning displayed on the client terminal 102, such as a scan setting screen and a scanned image preview screen. The setting means 322 receives the setting related to scanning from the user and performs the scanning setting. The transmission means 323 transmits information about scanning, such as a scan request, a scanned image request, and a scan status request. The acquisition means 324 acquires information about scanning from the external devices. The information acquired by the acquisition means 324 includes a response to the requests and data of the scanned images.

Next, with reference to FIG. 4 to FIG. 6, a screen provided by the scan app 320 in the client terminal 102 will be described. First, with reference to FIG. 4, a scan setting screen of the scan app 320 in the client terminal 102 will be described. FIG. 4 illustrates an example of a scan setting screen 400 in the first embodiment. On the scan setting screen 400, the user sets the transmission destination (address) of the scanned image, the read setting during scan execution, and the display setting of the preview screen.

A destination field 401 to a password 403 are fields used for setting the transmission destination of the scanned image. Each of the fields shown in FIG. 4 displays the current setting value. The destination field 401 is a field used for setting the transmission destination. The user can select a desired destination from among the destinations registered in the client terminal 102 by pressing the destination field 401. If the desired destination is not present in the list of destinations registered in the client terminal 102, a new destination can be input.

A username 402 and the password 403 are data (authentication information) related to the authentication at the transmission destination of the scanned image. The authentication information is used if authentication at the destination terminal 103, which is the transmission destination, is required during the transmission of the scanned image from the MFP 101 to the destination terminal 103. The username 402 is a field for entering a username serving as the authentication information. The password 403 is a button for entering a password serving as the authentication information. A plurality of destinations can be set as the destination for the scanned images. Additionally, if there are a plurality of destinations, the authentication information may be set for each destination. In FIG. 4, although the combination of the username and password is used as the authentication information, the authentication information is not limited thereto and other authentication information, for example, OAuth can be set.

Each of an object-to-be-read setting button 404 to a resolution setting button 409 is a button used for performing the read setting during scan. Each of the buttons shown in FIG. 4 displays the current setting value. The object-to-be-read setting button 404 is a button used for setting an object (for example, a platen and a feeder) on which reading is to be executed. A sheet size setting button 405 is a button used for setting a sheet size to be read (for example, A4 size). The color mode setting button 406 is a button used for setting the color mode (for example, color or black and white) during scan. The feed direction setting button 407 is a button used for setting the feed direction of the original (for example, vertical feed and horizontal feed). The file format setting button 408 is a button used for setting the file format of the scanned image (for example, JPEG and PDF). The resolution setting button 409 is a button used for setting the resolution during a scan (for example, 300 dpi).

A preview setting check box 410 is a check box for setting whether or not to display a preview screen showing the scanned image on the client terminal 102 before the preview screen is transmitted to the destination. To set the preview screen to be displayed, the user presses the preview setting check box 410 to place a check mark. In the present embodiment, it is assumed that the check mark is placed in the preview setting check box 410 only when the object to be read is a platen. Hence, in the present embodiment, if an object other than the platen, for example, a feeder, is selected by the object-to-be-read setting button 404 while the check mark is being placed in the preview setting check box 410, the check mark is cleared. A transmission start button 411 is a button used for starting the scan process. A cancel button 412 is a button used for closing the scan setting screen 400.

Next, with reference to FIG. 5, a preview display screen of the scan app 320 in the client terminal 102 will be described. FIG. 5 illustrates an example of a preview screen 500. The preview screen 500 is a screen that performs a preview display of the image generated by scanning in the MFP 101. The preview screen 500 is displayed by the client terminal 102 when a check mark is placed in the preview setting check box 410 in the scan setting screen 400 so that a preview display is set.

In a preview image region 501, the scanned image acquired from the MFP 101 is displayed. A continuous transmission button 502 is a button used for continuing the process of transmitting the scanned image to the destination. A cancel button 503 is a button used for cancelling the transmitting process for the scanned image.

Next, with reference to FIG. 6, the transmission completion screen of the scan app 320 will be described. FIG. 6 illustrates an example of a transmission completion screen 600 of the scan app 320 in the client terminal 102. A message region 601 displays the transmission results of the scanned image. Specifically, when the transmission of the scanned image to the destination is successful, a message indicating that the transmission has been completed is displayed in the message region 601. In contrast, if a transmission error of the scanned image occurs, an error message or an error code is displayed in the message region 601. A completion button 602 is a button used for closing the scan app 320.

Next, with reference to FIG. 7, a sequence of the scan process for displaying a preview screen when the scan process is performed in the present embodiment will be described. FIG. 7 illustrates an example of the sequence of the scan process in the first embodiment. In the scan process of the present embodiment, when the MFP 101 transmits the scanned image to the destination terminal 103 in response to an instruction from the client terminal 102, the client terminal 102 performs a preview display of the image that has been scanned before the image is transmitted to the destination terminal 103. Accordingly, the user who has instructed the scanning can confirm the scanned image before the image is transmitted to the destination terminal 103.

In S701, the client terminal 102 displays the scan setting screen by the scan application. For example, the scan setting screen 400 shown in FIG. 4 is displayed on the display unit 306 of the client terminal 102. In S702, the client terminal 102 receives the user's operation for the destination setting, the scan reading setting, and the preview setting on the scan setting screen 400, and performs the setting. In the scan setting screen, preview setting is also performed about whether or not a preview display of the scanned image is to be performed on the client terminal 102. In the present embodiment, the case in which the destination terminal 103 is set as the destination of the scanned image and the setting for performing the preview display is further performed will be described.

In S703, the client terminal 102 detects that the transmission start button 411 has been pressed. The client terminal 102 switches the operations following S704 depending on whether or not a check mark is placed in the preview setting check box 410. This sequence describes the case in which the check mark is placed in the preview setting check box 410, that is, the case in which the setting for displaying a preview screen of the scanned image is received.

S704 to S708 are the processes that are executed for displaying the preview screen of the scanned image in the client terminal 102. When the preview setting is received, in S704, the client terminal 102 requests MFP 101 to perform pull scanning. Specifically, the client terminal 102 instructs the MFP 101 to execute scanning and transmit the scanned image to the client terminal 102. In S705, the MFP 101 responds to the request from the client terminal 102 in S704.

In S706, the MFP 101 executes the scan process. Specifically, the original is scanned according to the read setting set in S702 and image data are generated. In the first embodiment, the original placed on the platen is optically read and image data are generated. In S707, the client terminal 102 requests the MFP 101 to acquire the scan status of the pull scanning as instructed in S704. In S708, the MFP 101 responds to the request for status acquisition from the client terminal 102 in S707. When the scanning is completed, the MFP 101 replies that the scan has been competed, and when the scanning is not completed, replies that the scanning process is in progress. When the scan process is not completed, the client terminal 102 performs the acquisition request for the scanning status again (S707). In contrast, when the scan process is completed, the process proceeds to S709.

In S709, the client terminal 102 requests the MFP 101 to provide a scanned image. In S710, the MFP 101 responds to the request for the scanned image from the client terminal 102 in S709, and transmits the scanned image in S706 to the client terminal 102. In S711, the client terminal 102 displays the scanned image acquired from the MFP 101 in S710 on the preview screen. For example, the client terminal 102 displays the preview screen 500 as shown in FIG. 5, and the scanned image acquired from the MFP 101 in S710 is displayed in the preview image region 501 of the preview screen 500. As described above, when push scanning is performed, pull scanning is instructed to be performed first so that the client terminal 103 can preview and display the scanned image for confirmation before the image is transmitted to the destination terminal 102.

After confirming the scanned image on the preview screen 500, the user selects whether or not to transmit the scanned image to the destination terminal 103 or to end the scan process. The case in which the scanned image is transmitted to the destination terminal 103 will be described below. In S713, the client terminal 102 detects that the continuous transmission button 502 has been pressed on the preview screen 500. In S714, the client terminal 102 requests the MFP 101 to execute a push scanning. Specifically, the client terminal 102 instructs the MFP 101 to execute scanning and transmit the scanned image to the transmission terminal 103. In S714, the MFP 101 responds to the client terminal 102 that the request from the client terminal 102 in S713 has been received.

In S715, the MFP 101 executes the scan process. In S716, the MFP 101 transmits the scanned image to the destination specified in the push scan request in S713. In the present embodiment, the MFP 101 transmits the scanned image to the destination terminal 103. In S717, the destination terminal 103 responds to the transmission of the scanned image in S716.

In S718, the client terminal 102 requests the MFP 101 to acquire the scan status of the push scanning as instructed in S713. In S719, the MFP 101 responds to the request for status acquisition from the client terminal 102 in S718. If the scan process has not been completed, the client terminal 102 performs the acquisition request of the scan status again (S718). In contrast, if the scan process has been completed, in S720, the client terminal 102 displays the transmission completion screen 600.

Figure 9:
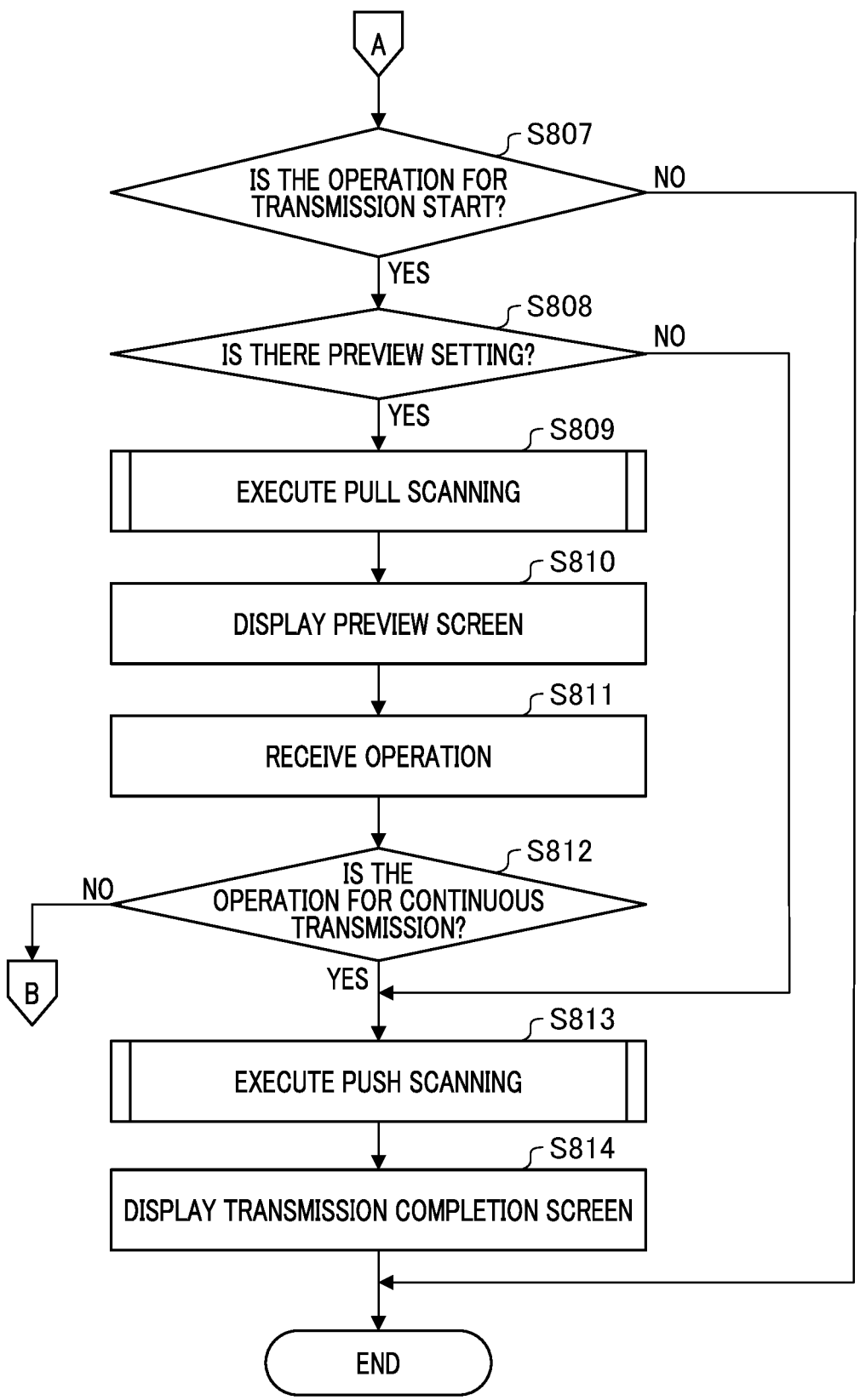
FIG. 9 is a flowchart showing a process of the client terminal according to the first embodiment.

Next, with reference to FIG. 8 and FIG. 9, a process flow of the client terminal 102 in the scan process of the present embodiment will be described. FIG. 8 and FIG. 9 are flowcharts showing the process of the client terminal 102 in the first embodiment. The process of the client terminal 102 in the flowcharts of FIG. 8 and FIG. 9 is realized by the CPU 301 of the client terminal 102 reading and executing a program stored in the ROM 302, the storage unit 304, or the like. An example will be described in which HTTP is used for each communication and the IP address of the MFP 101 is "192.168.1.100".

In S801, the providing means 321 of the scan app 320 and the display means 314 display a scan setting screen for setting the transmission destination of the scanned image, the scan reading setting, and the preview setting. Specifically, the providing means 321 of the scan app 320 provides the scan setting screen 400 shown in FIG. 4 to the display means 314, and the display means 314 displays the scan setting screen 400 provided from the scan app 320 on the display unit 306 of the client terminal 102.

In S802, the operation means 313 and the setting means 322 of the scan app 320 receive the user's operation on the scan setting screen. In S803, the setting means 322 of the scan app 320 determines whether or not the operation received in S802 is for the read setting. Specifically, when the user' pressing operation for any one of the object-to-be-read setting button 404 to the resolution setting button 409 is detected on the scan setting screen 400, the setting means 322 determines that the operation is for the read setting. When the operation received in S802 is the operation for the read setting, the process proceeds to S804. In contrast, when the operation received in S802 is not the operation for the read setting, the process proceeds to S705.

In S804, the setting means 322 of the scan app 320 updates the corresponding read setting to the contents of the read setting received in S802. For example, when the operation received in S802 is the operation for changing from black-and-white to color in the color mode setting button 406, the setting means 322 updates the setting of the color mode during scan to color. Subsequently, the process proceeds to S802 and the user's operation on the scan setting screen 400 is received again.

In S805, the setting means 322 of the scan app 320 determines whether or not the operation received in S802 is the operation for the destination setting. Specifically, when any one of the destination field 401 to the password 403 is pressed by the user on the scan setting screen 400, the setting means 322 determines that this operation is for destination setting. When the operation received in S802 is the operation for the destination setting, the process proceeds to S806. In contrast, when the operation received in S802 is not the operation for the destination setting, the process proceeds to S807.

In S806, the setting means 322 of the scan app 320 updates the corresponding reading setting to the contents of the destination setting received in S802. In S807, the setting means 322 of the scan app 320 determines whether or not the operation received in S802 is for a transmission start. When the transmission start button 411 is pressed, the setting means 322 determines that this operation is for the transmission start and the process proceeds to S808. In contrast, when the cancel button 412 is pressed, the setting means 322 determines that this operation is not for the transmission start, and the process ends.

In S808, the setting means 322 of the scan app 320 determines whether or not the preview setting is set. Specifically, the setting means 322 determines whether or not the preview setting is set based on whether or not a check mark is placed in the preview setting check box 410 of the scan setting screen 400. When the check mark is placed in the preview setting check box 410 of the scan setting screen 400, the setting means 322 determines that the preview setting is set, and the process proceeds to S808. In contrast, when the check mark is not placed in the preview setting check box 410, the setting means 322 determines that the preview setting is not set, and the process proceeds to S813.

When the preview setting is set, the client terminal 102 acquires the scanned image to be used for a preview from the MFP 101. Specifically, the client terminal 102 instructs the MFP 101 to perform a pull scanning to acquire a scanned image used for a preview in the client terminal 102 from the MFP 101. In S809, the scan app 320 instructs the MFP 101 to perform a pull scanning and acquires the scanned image from the MFP 101. A detailed description of S809 will be provided below with reference to FIG. 10A. In S809, instead of the pull scanning, a push scanning may be performed in which the client terminal 102 is set as the destination. When the push scanning, in which the client terminal 102 is set as the destination, is performed, the destination information may not include the authentication information.

In S810, the providing means 321 of the scan app 320 and the display means 314 display the scanned image acquired in S809 on the preview screen. Specifically, the providing means 321 provides the preview screen 500, which uses the scan image shown in FIG. 5, to the display means 314, and the display means 314 displays the preview screen 500 provided from the scan app 320 on the display unit 306 of the client terminal 102.

In S811, the operation means 313 and the setting means 322 of the scan app 320 receive the user's operation on the preview screen. In S812, the operation means 313 and the transmission means 323 of the scan app 320 determine whether or not the operation received in S812 is for continuous transmission. When the continuous transmission button 502 is pressed, the transmission means 323 determines that the operation received in S812 is for the continuous transmission, and the process proceeds to S813. In contrast, when the cancel button 503 is pressed, the transmission means 323 determines that the operation received in S812 is not for the continuous transmission, and the process returns to S801.

In S813, the scan app 320 of the client terminal 102 20 instructs the MFP 101 to perform a push scanning. A detailed description of S813 will be provided below with reference to FIG. 10B. In S814, the providing means 321 of the scan app 320 and the display means 314 display the transmission completion screen. Specifically, the providing means 321 provides the transmission completion screen 600 showing the execution result of the push scanning shown in FIG. 6 to the display means 314, and the display means 314 displays the transmission completion screen 600 provided from the scan app 320 on the display unit 306 of the client terminal 102. Subsequently, this process ends.

Figure 10A:
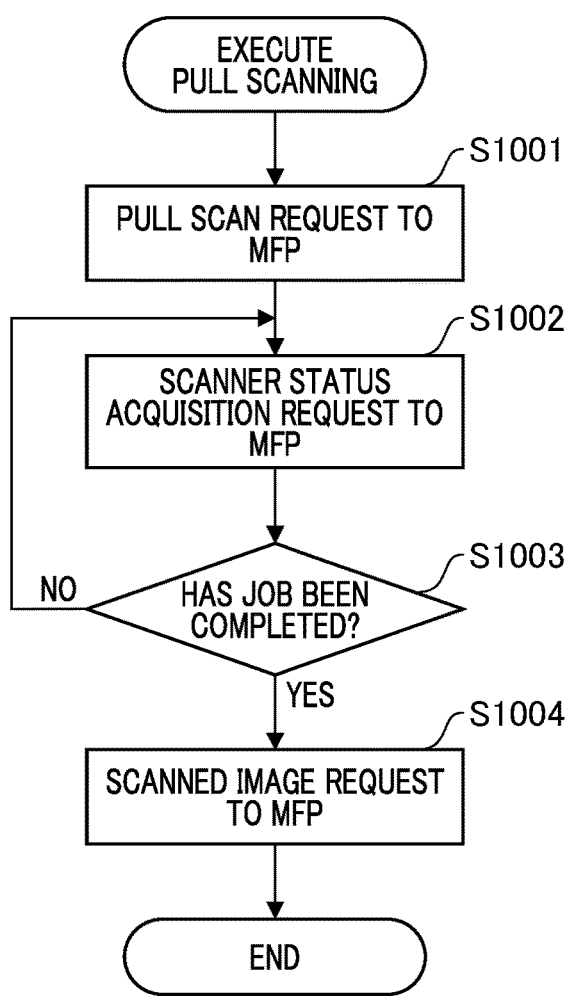
FIGS. 10A and 10B illustrate the flowcharts of pull scanning and push scanning processes.
Figure 10B:
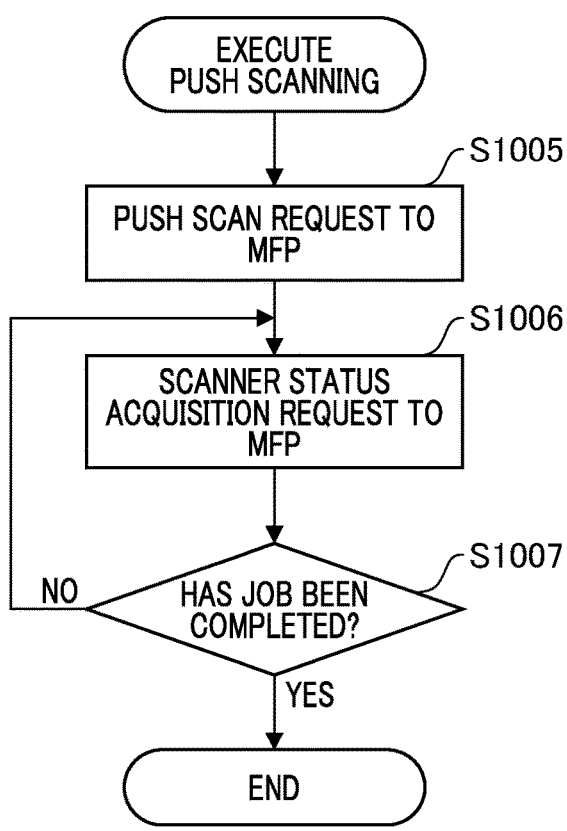

Next, the process of the push scanning in S809 and the process of the push scanning in S813 will be described in detail. FIG. 10A and FIG. 10B are flowcharts showing the process of the client terminal 102 in the first embodiment. FIG. 10A illustrates the process of the client terminal 102 during pull scanning and FIG. 10B illustrates the process of the client terminal 102 during push scanning. The process of the client terminal 102 in the flowcharts of FIG. 10A and FIG. 10B is realized by the CPU 301 of the client terminal 102 reading and executing a program stored in the ROM 302, the storage unit 304, or the like.

First, the pull scanning in S809 will be described in detail. In S1001, the transmission means 323 of the scan app 320 transmits a pull scanning instruction to the MFP 101 via the communication means 311 (S704 in FIG. 7). FIG. 11A illustrates one example of the contents of the pull scan request that is transmitted from the client terminal 102 to the MFP 101 in S1001. The pull scan request is performed by using the POST method on the URI (Uniform Resource Identifier) "http://192.168.1.100/ScanJob" that corresponds to the MFP 101.

The pull scanning instruction includes the scan reading setting. For example, the scan reading setting included in the pull scanning instruction is the same as the read setting in the push scan reading setting set in S804. The scan reading setting is described below the ScanJob element in XML (eXtensible Markup Language) format in the message body. Source element represents an object to be read, where "Platen" indicates that the object to be read is a platen. Direction element represents a feed direction, where "ShortEdgeFeed" indicates that the feed direction is short-side feed. Size element represents the size of a sheet to be read, where "A4" indicates that the size of the sheet to be read is A4. Format element represents a file transmission, where "jpeg" indicates that the file format is JPEG format. Color Mode element represents a color mode, where "Color" indicates that the color mode is color. Resolution element represents a resolution during scan. Note that the read setting performed when the pull scanning is instructed to acquire a preview scan image does not necessarily have to be the same as the setting performed in S804, and a minimum setting that confirms whether or not the original is correctly placed or whether color or black-and-white is set may be performed. The destination is not included in the contents of the pull scanning instruction.

When receiving the pull scan request from the client terminal 102, the MFP 101 returns a response to the client terminal 102 (S705 in FIG. 7). FIG. 11B illustrates an example of the successful response to the pull scan request (HTTP POST request). The response to the pull scanning includes the information for acquiring the scanned image that is generated by the scan according to the pull scanning instruction. "Location: http://192.168.1.100/ScanJob/1" indicates the URI for acquiring a scan image by the requested pull scanning. After returning the response to the pull scanning request, the MFP 101 executes the scan process and generates the scanned image.

In S1002, the transmission means 323 of the scan app 320 requests the MFP 101 to acquire the scan status (S707 in FIG. 7). The request for acquiring the scan status is performed by using the GET method on the URI, for example, "http://192.168.1.100/ScannerStatus". The MFP 101 sends a response to the scan status acquisition request from the client terminal 102 (S708 in FIG. 7). An example of the response to the scan status acquisition request is shown in FIG. 12A and FIG. 12B.

FIG. 12A and FIG. 12A illustrate an example of the response to the scan status acquisition request. The details of the scan status are described below the ScannerStatus element in XML format in the message body. State element represents a status of the scan job, where "Scanning" indicates that a scan is being performed, and "Idle" indicates that the scan job is waiting. ScanPage element represents the number of pages that have been scanned. JobStatus element represents a status of the scan job, where "Processing" indicates that the scan job is being processed and "Completed" indicates that the scan job has been completed. JobResult element represents the result of the scan job, where "Success" indicates that scan job has ended normally.

In S1003, the acquisition means 324 of the scan app 320 determines whether or not the scan job requested in S1001 has been completed. The acquisition means 324 determines whether or not the scan job has been completed based on the contents of the response from the MFP 101 to the acquisition request of the scan status. Specifically, in the response acquired from the MFP 101, when the JobStatus element is "Completed", the acquisition means 324 determines that the scan job has been completed. In contrast, when the JobStatus element is "Processing", the acquisition means 324 determines that the scan job is being processed and it has not been completed. If the acquisition means 324 determines that the scan job has been completed, the process proceeds to S1004. In contrast, if the acquisition means 324 determines that the scan job has not been completed, the process proceeds to S1002 and the acquisition request of the scan status is again transmitted to the MFP 101.

In S1004, the transmitting means 323 of the scan app 320 requests the MFP 101 for the scanned image (S709 in FIG. 7). The request for the scanned image can be performed by using the GET method on the URI responded to in S1001. The MFP 101 responds to the scan image request from the client terminal 102 with the binary data of the scanned image (S710 in FIG. 7). The acquisition means 324 of the scan app 320 of the client terminal 102 acquires the scanned image from the MFP 101. After acquiring the scanned image from the MFP 101, the scan app 320 ends the pull scan processing and the process proceeds to S810.

Next, the push scanning in S813 will be described in detail. In S1005, the transmission means 323 of the scan app 320 transmits a push scanning instruction, in which the transmission destination of the scanned image is the destination terminal 103, to the MFP 101 (S713 in FIG. 7). FIG. 13A illustrates an example of the contents of the push scanning scan request that is transmitted from the client terminal 102 to the MFP 101 in S1005. Similar to the pull scan request (FIG. 11A), the push scan request is performed by using the POST method on the URI "http://192.168.1.100/ScanJobs" that corresponds to the MFP 101.

The push scanning instruction includes the destination information and the scan reading setting. The destination information and the scan reading setting are described in the ScanJob element in XML format in the message body part. The respective elements from the Source element to the Resolution element representing the read setting are the same as those in FIG. 11A. The destination information indicating the transmission destination of the scanned image is described in Destination element. The Uri element represents the URI of the destination. In the present embodiment, the URI of the destination terminal 103 is described. UserName element represents the username for the authentication information. Password element represents the password for the authentication information. FIG. 11B illustrates an example of successful responses to the push scanning request (HTTP POST request). The response to the push scanning does not include the URI for acquiring the scanned image included in the response to the pull scanning. After returning a response to the request for the push scanning, the MFP 101 executes the scan process and generates scanned images. Subsequently, the MFP 101 transmits the generated scanned image to the specified transmission destination.

In S1006, the transmission means 323 of the scan app 320 requests the MFP 101 to acquire the scan status (S718 in FIG. 7). The acquisition request for the scan status is performed by using the GET method on the URI "http://192.168.1.100/ScannerStatus". In response to the acquisition request for the scan status from the client terminal 102, the MFP 101 responds to the scan status (S719 in FIG. 7). The contents of the response to the acquisition request for the scan status are the same as those in the pull scanning.

In S1007, the acquisition means 324 of the scan app 320 acquires the response to the acquisition request for the scan status from the MFP 101, and determines whether or not the scan job requested in S1005 has been completed. The acquisition means 324 determines whether or not the scan job has been completed based on the contents of the response from the MFP 101 to the acquisition request of the scan status that have been transmitted in S1006. Specifically, in the response acquired from the MFP 101, when JobStatus element is "Completed", the acquisition means 324 determines that the scan job has been completed. If the scan job is determined to be completed, the push scanning processing ends, and the process proceeds to S914. In contrast, if the acquisition means 324 determines that the scan job has not been completed, the process proceeds to S1006, and the acquisition request for the scan status is again transmitted to the MFP 101.

Figure 14:
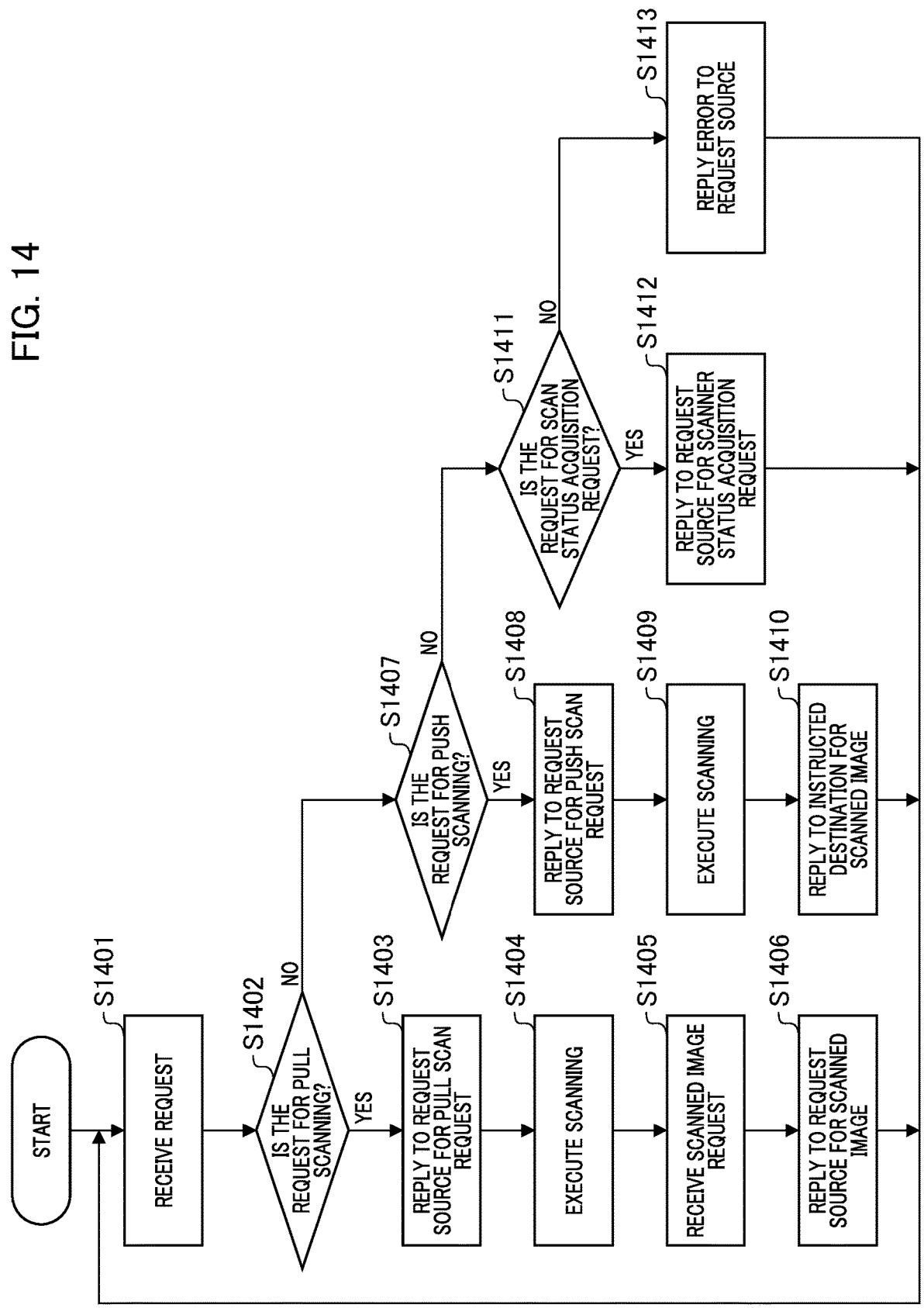
FIG. 14 is a flowchart showing a process of the MFP according to the first embodiment.

Next, with reference to FIG. 14, a flow of the scan process in the MFP 101 in the present embodiment will be described. FIG. 14 is a flowchart showing the scan process of the MFP 101 in the first embodiment. The process of the MFP 101 in the flowchart in FIG. 14 is realized by the CPU 201 of MFP 101 reading and executing a program stored in the ROM 202, the HDD 208, or the like.

In S1401, the request receiving means 217 of the MFP 101 receives a request from the client terminal 102 via the network 104 and the communication means 211. In S1402, the request receiving means 217 determines whether or not the request received in S1401 is the pull scan request. The request receiving means 217 determines that the request is the pull scan request if the request is the POST method to "http://192.168.1.100/ScanJob" and the Destination element is not included below the ScanJob element of the message body part. If the request receiving means 217 determines that the request is the pull scan request, the process proceeds to S1403. In contrast, if the request receiving means 217 determines that the request is not the pull scan request, the process proceeds to S1407.

The case in which the request received by the MFP 101 from the client terminal 102 is the pull scan request will be described. In S1403, the transmission means 221 of the MFP 101 issues a URI for acquiring the scanned image, and returns a response including the URL to the request source of the pull scan request (S705). For example, in S1401, when the pull scan request (FIG. 11A) that is transmitted from the client terminal 102 in S1001 (S704) is received, the transmission means 221 transmits the response shown in FIG. 11B to the client terminal 102.

In S1404, the execution means 220 of the scanning means 216 executes scanning by using the read setting included in the pull scan request that has received in S1401 and generates a scanned image (S706). In S1405, the request receiving means 217 receives the acquisition request of the scanned image from the client terminal 102 via the network 104 and the communication means 211 (S709). In S1406, the transmission means 221 transmits the scanned image to the client terminal 102 that is the request source of the acquisition request of the scanned image in S1405 (S710). Thus, the client terminal 102 can acquire the scanned image from the MFP 101 by performing the pull scan request. The client terminal 102 can perform a preview display of the scanned image by acquiring the scanned image in advance by the pull scanning when the push scanning is performed. Thus, the process for the pull scan request ends, and the process returns to S1401.

In S1207, the request receiving means 217 determines whether or not the request received in S1401 is the push scan request. The request receiving means 217 determines that the request is the push scanning request when the request is a POST method to "http://192.168.1.100/ScanJob" and the Destination element is included below the ScanJob element of the message body part. When the request receiving means 217 determines that the request is the push scanning request, the process proceeds to S1408. In contrast, the request receiving means 217 determines that the request is not the push scanning request, the process proceed to S1411.

The case in which the request received by the MFP 101 from the client terminal 102 is the push scan request will be described. In S1408, the transmission means 221 of the scanning means 216 returns a response to the request source of the push scanning request (S714). For example, in S1401, when the push scan request (FIG. 13A) transmitted from the client terminal 102 in S1005 (S713) is received, the transmission means 221 transmits the response shown in FIG. 13B to the client terminal 102.

In S1409, the execution means 220 of the scanning means 216 executes scanning by the read setting included in the push scanning request received in S1401 and generates a scanned image (S715). In S1410, the transmission means 221 transmits the scanned image to the transmission destination (destination) of the scanned image included in the push scanning request received in S1401 (S716). When the authentication information is required for the access to the transmission destination, the transmission means 221 transmits the scanned image to the transmission destination by using the authentication information included in the push scanning request. Thus, the process for the push scanning request ends and the process returns to S1401.

In S1411, the request receiving means 217 determines whether or not the request received in S1401 is the scan status acquisition request. When the request is the GET method to "http://192.168.1.100/ScannerStatus", the request receiving means 217 determines that the request is the scan status acquisition. When the request receiving means 217 determines that the request is the scan status acquisition, the process proceeds to S1412. In contrast, when the request receiving means 217 determines that the request is not the scan status acquisition, the process proceeds to S1413.

In S1412, the transmission means 221 replies to the request source of the scan status acquisition request with the scan status. For example, when the scan job is being processed, the transmission means 221 performs the response shown in FIG. 12A on the client terminal 102. In contrast, when the scan job is completed, the transmission means 221 performs the response shown in FIG. 12B on the client terminal 102. Thus, the process for the scan status acquisition request ends, and the process returns to S1401.

If the request received in S1401 is neither the pull scan request, the push scan request, nor the scan status acquisition request, in S1413, the request receiving means 217 replies with an error to the request source. After the error response is transmitted, the process returns to S1401.

As described above, according to the present embodiment, when the user instructs the image processing apparatus to perform the push scanning of the original placed on the platen, the user can preview the scanned image to be transmitted.

Second Embodiment

As the second embodiment, a description will be given of a method for displaying a preview of the scanned image in the client terminal when the client terminal instructs the image processing apparatus to perform the push scanning. In the first embodiment, although only the original placed on the platen is scanned, the original to be scanned in the second embodiment is assumed to be the original placed on the platen or the feeder. In the feeder, a plurality of originals can be scanned. Additionally, in the feeder, when the push scanning is executed after the pull scanning for acquiring the preview screen, the original must be set again in the feeder. Hereinafter, the difference with the first embodiment in that the original placed on the feeder can also be scanned will be mainly described below, and the same points as those of the first embodiment will be omitted.

The scan setting screen 400 of the scan app 320 of the client terminal 102 in the present embodiment is the same as that in the first embodiment. Although, in the first embodiment, the preview setting can be performed only when the object to be read is the platen, in the present embodiment, a check mark can be placed in the preview setting check box 410 even when the object to be read is an object other than the platen. That is, there is a difference with the first embodiment in that the check mark of the preview setting check box 410 is not cleared according to the setting of the object-to-be-read setting button 404.

Figure 15:
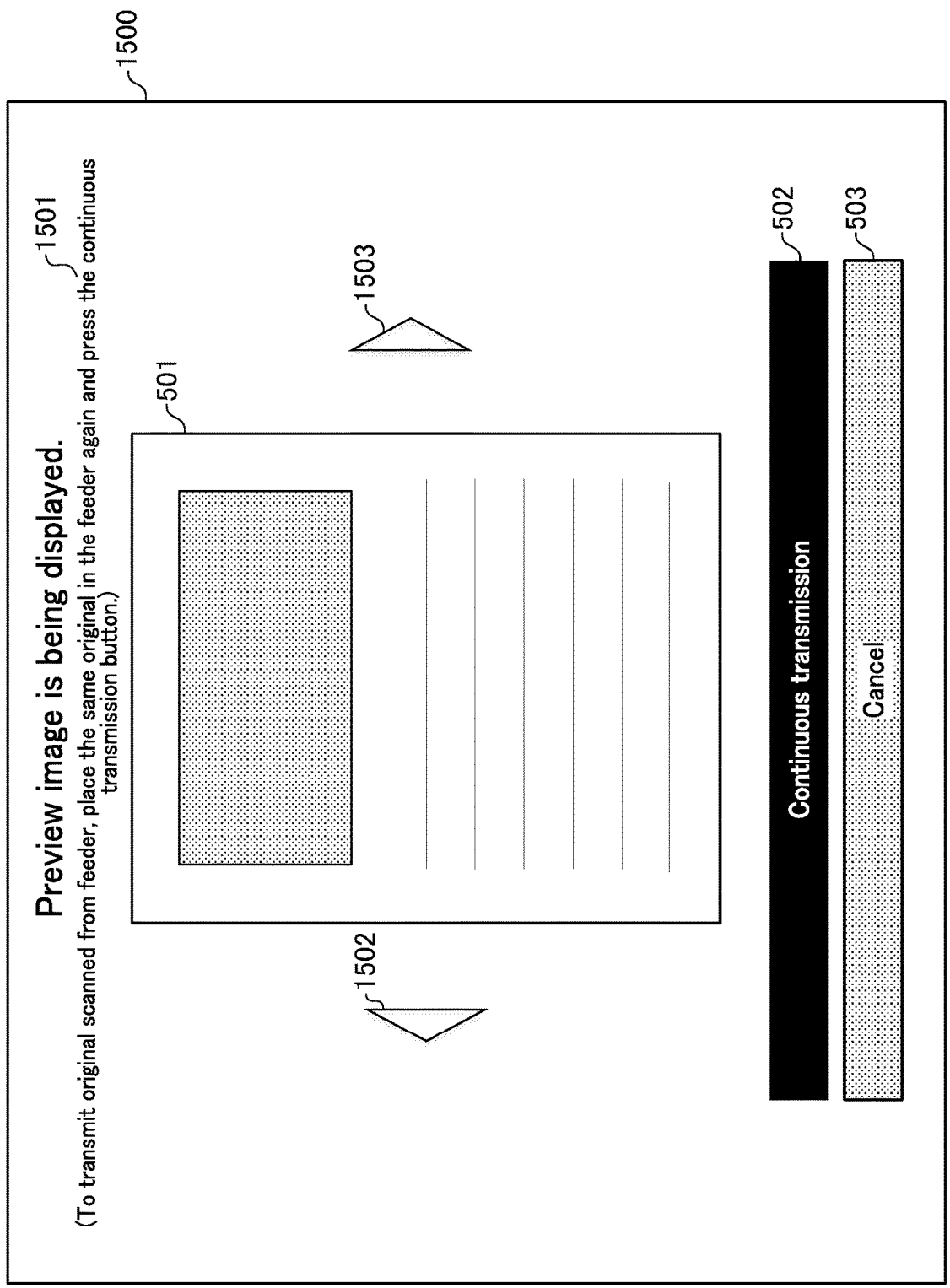
FIG. 15 illustrates a preview screen according to the second embodiment.

The preview screen of the scanned image displayed by the scan app 320 of the client terminal 102 in the present embodiment is in part different from that in the first embodiment. FIG. 15 illustrates an example of the preview screen in the second embodiment. The same reference numerals as those in the first example are used for the same constituent elements and description thereof will be omitted. To scan the original in the feeder by the setting for performing the preview display, the original read by a pull scanning for the preview screen display must be set in the feeder again to perform a push scanning. Accordingly, a message 1501 urging the user to set the original again in the feeder, for example, "To transmit the original scanned from feeder, place the same original in the feeder again." is displayed on a preview screen 1500. When the user transmits the original that has been scanned from the feeder, the user again sets the original in the feeder and presses the continuous transmission button 502.

When a plurality of pages of the original is read from the feeder, a previous page feed button 1502 and a next page feed button 1503 for switching the scanned images displayed in the preview image region 501 are displayed on the preview screen 1500. The previous page feed button 1502 is a button used for performing a preview display of an image that was scanned before the scanned image being currently displayed in the preview image region 501. The next page feed button 1503 is a button used for performing a preview display of an image that was scanned next to the scanned image being currently displayed in the preview image region 501. Although, in the present embodiment, when a plurality of pages of the scanned images is displayed on the preview screen, an example of displaying the images for each page on the preview screen and switching the pages to be displayed by the page feeding has been described, the present invention is not limited thereto. For example, a plurality of pages of the scanned images may be displayed side by side, or two pages may be displayed each time.

Figure 16:
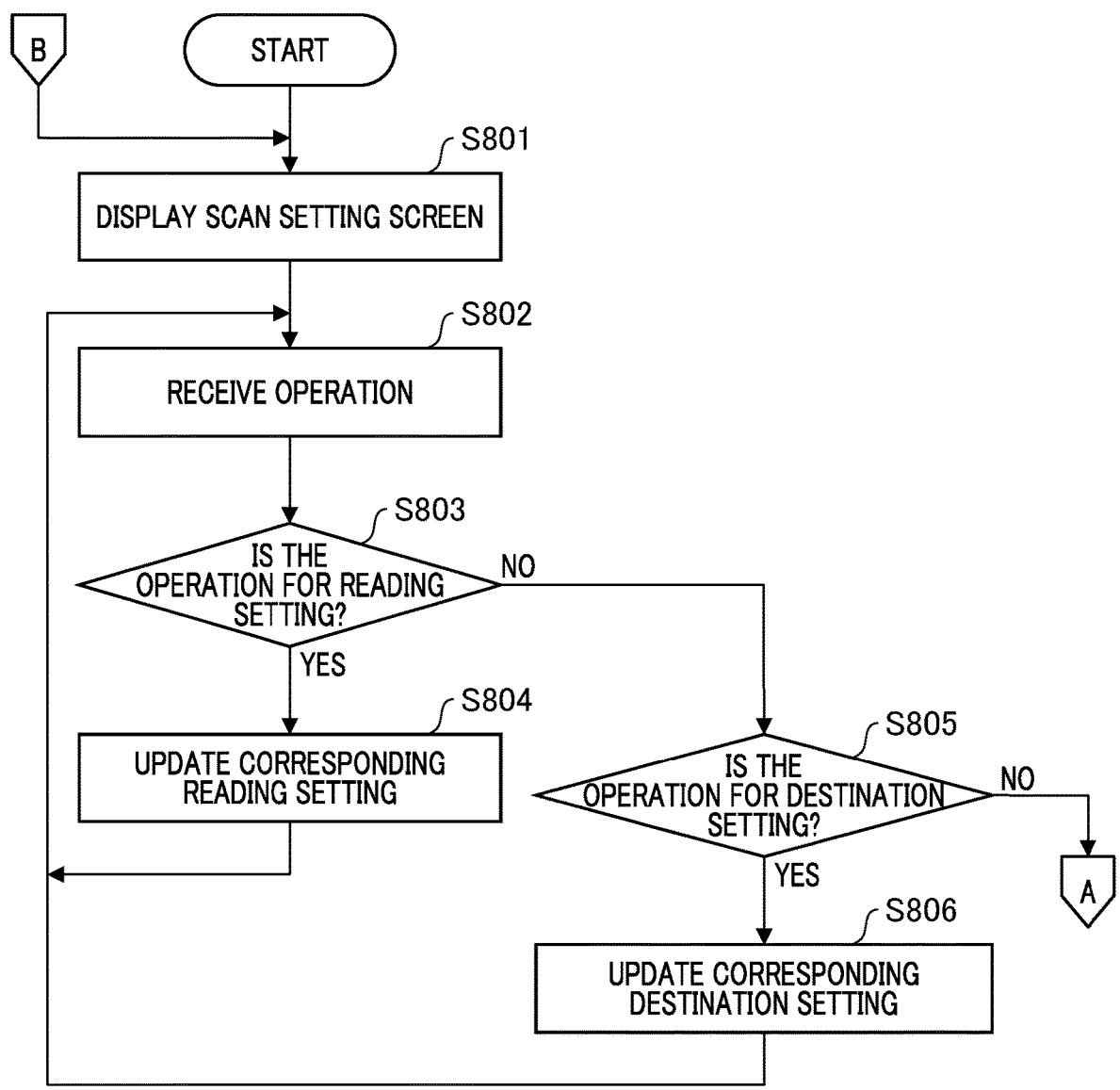
FIG. 16 is a flowchart showing a process of the client terminal according to the second embodiment.
Figure 17:
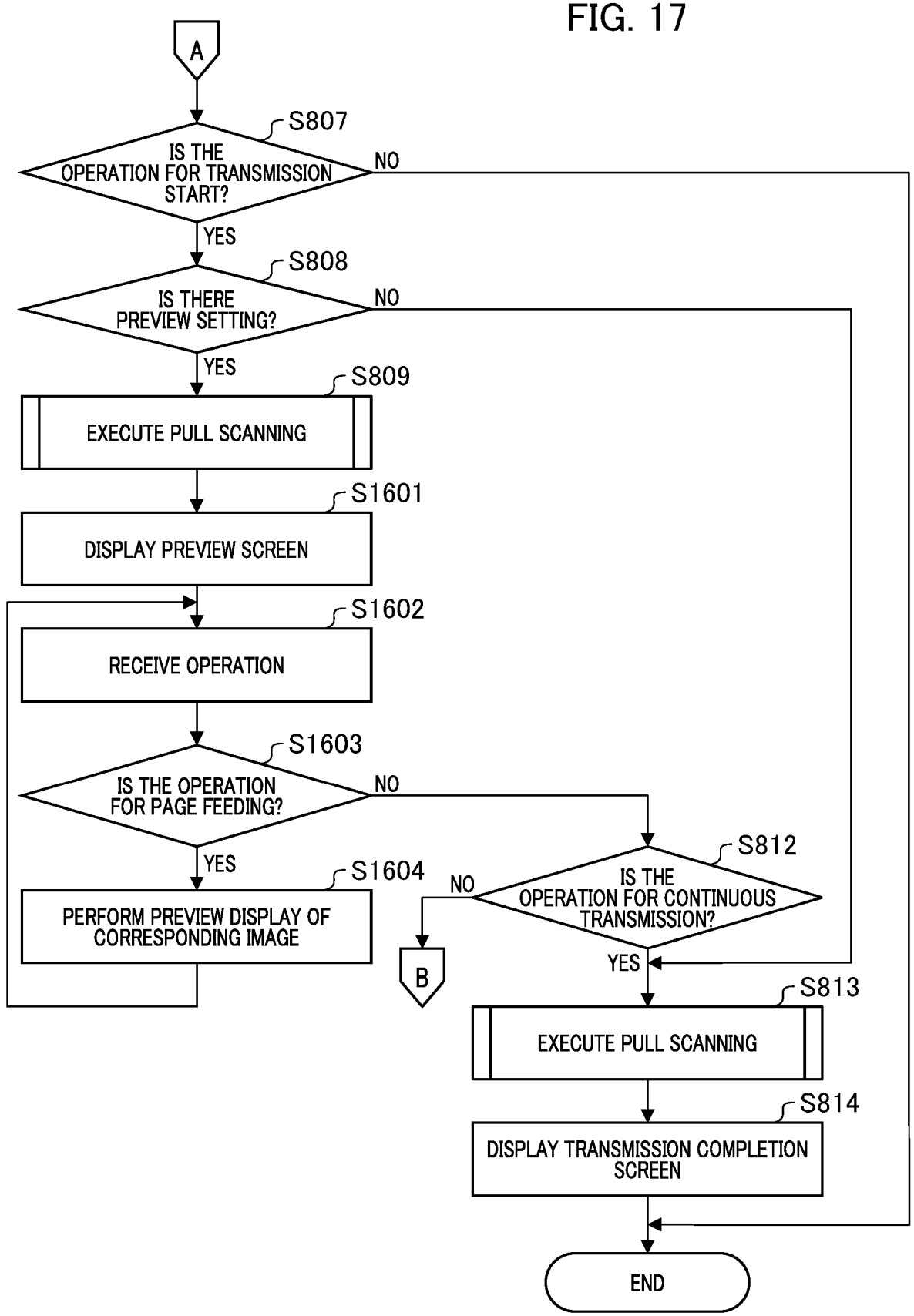
FIG. 17 is a flowchart showing a process of the client terminal according to the second embodiment.

Next, with reference to FIG. 16 and FIG. 17, a process flow of the client terminal 102 in the present embodiment will be described. FIG. 16 and FIG. 17 are flowcharts showing the process of the client terminal 102 in the second embodiment. The process of the client terminal 102 in the flowcharts of FIG. 16 and FIG. 17 is realized by the CPU 301 of the client terminal 102 reading and executing a program stored in the ROM 302, the storage unit 304, or the like. The same processes as those in the first embodiment are denoted by the reference numerals that are the same as those in FIG. 7 and FIG. 8, and description thereof will be omitted.

When the preview setting is performed, the client terminal 102 executes the pull scanning on the MFP 101 and acquires the scanned image from the MFP 101 (S809). Instead of the pull scanning, the client terminal 102 can be set as the destination and the push scanning can be performed. In S1601, the providing means 321 of the scan app 320 and the display means 314 display the scanned image acquired in S809 on the preview screen. Specifically, the providing means 321 provides the preview screen 1500 using the scan image shown in FIG. 15 to the display means 314, and the display means 314 displays the preview screen 1500 provided from the scan app 320 on the display unit 306 of the client terminal 102.

In S1602, the operation means 313 and the setting means 322 of the scan app 320 receive the user's operation on the preview screen 1500. In S1603, the operation means 313 and the providing means 321 of the scan app 320 determine whether or not the operation received in S1602 is the page feeding. When the previous page feed button 1502 or the next page feed button 1503 is pressed, the operation is determined to be the page feeding. If the operation is the page feeding, the process proceeds to S1604. In contrast, if the operation is not the page feeding, the process proceeds to S812. In S1604, the providing means 321 of the scan app 320 and the display means 314 display the scanned image corresponding to the operation received in S1602 on the preview screen 1500. When the previous page feed button 1502 is pressed, the preview display of the image, which was scanned before the scanned image being currently displayed in the preview image region 501, is performed. When the next page feed button 1503 is pressed, the preview display of the image, which was scanned next after the scanned image being currently displayed in the preview image region 501, is performed. After the preview display of the scanned image according to the operation received in S1602, the process returns to S1602.

If the operation received in S1602 is not the page feeding, the process proceeds to S812, and the processes S812 to S814, which are the same those in the first embodiment, are performed. To scan the original from the feeder in the push scanning in S813, the user needs to again set the original to which the pull scanning has been performed in S809 in the feeder.

As described above, according to the second embodiment, when the user instructs the image processing apparatus to perform the push scanning for the original placed on the platen or the feeder, the user can preview the scanned image to be transmitted.

Third Embodiment

As the third embodiment, a method for confirming the scanned image in the client terminal 102, which has provided with an instruction for push scanning after the push scanning, will be described. In the present embodiment, the destination terminal 103 that has received the scanned image by the push scanning notifies the client terminal 102 about the storage location of the scanned image, the client terminal 102 accesses the storage location, and thereby the scanned image is displayed. The same configurations as those in the first embodiment, such as the configuration of the system and the configuration of each device, will be omitted.

Figure 18:
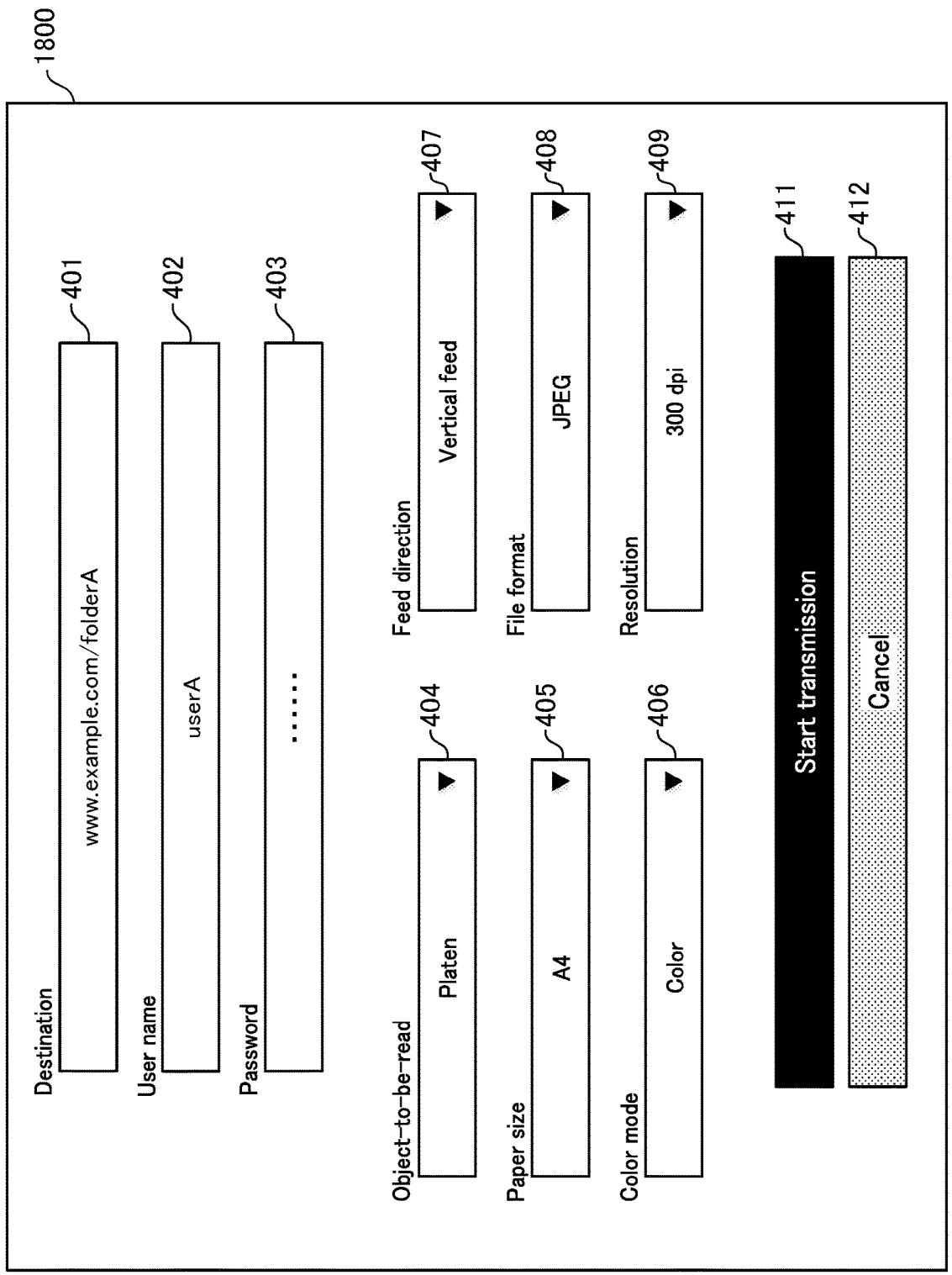
FIG. 18 illustrates the scan setting screen according to the third embodiment.

An example of the scan setting screen of the scan app 320 in the client terminal 102 will be described with reference to FIG. 18. FIG. 18 illustrates an example of a scan setting screen 1800 according to the third embodiment. The same configuration as that of the scan setting screen 400 (FIG. 4) of the first embodiment is denoted by the same reference numerals, and description thereof will be omitted. The user sets the transmission destination (address) of the scanned image and the read setting during scan execution on the scan setting screen 1800. The setting contents set by the destination field 401 to the password 403 that set the transmission destination of the scanned image and the object-to-be-read setting button 404 to the resolution setting button 409 that set the read setting of the scan are the same as those in the first embodiment.

Figure 19:
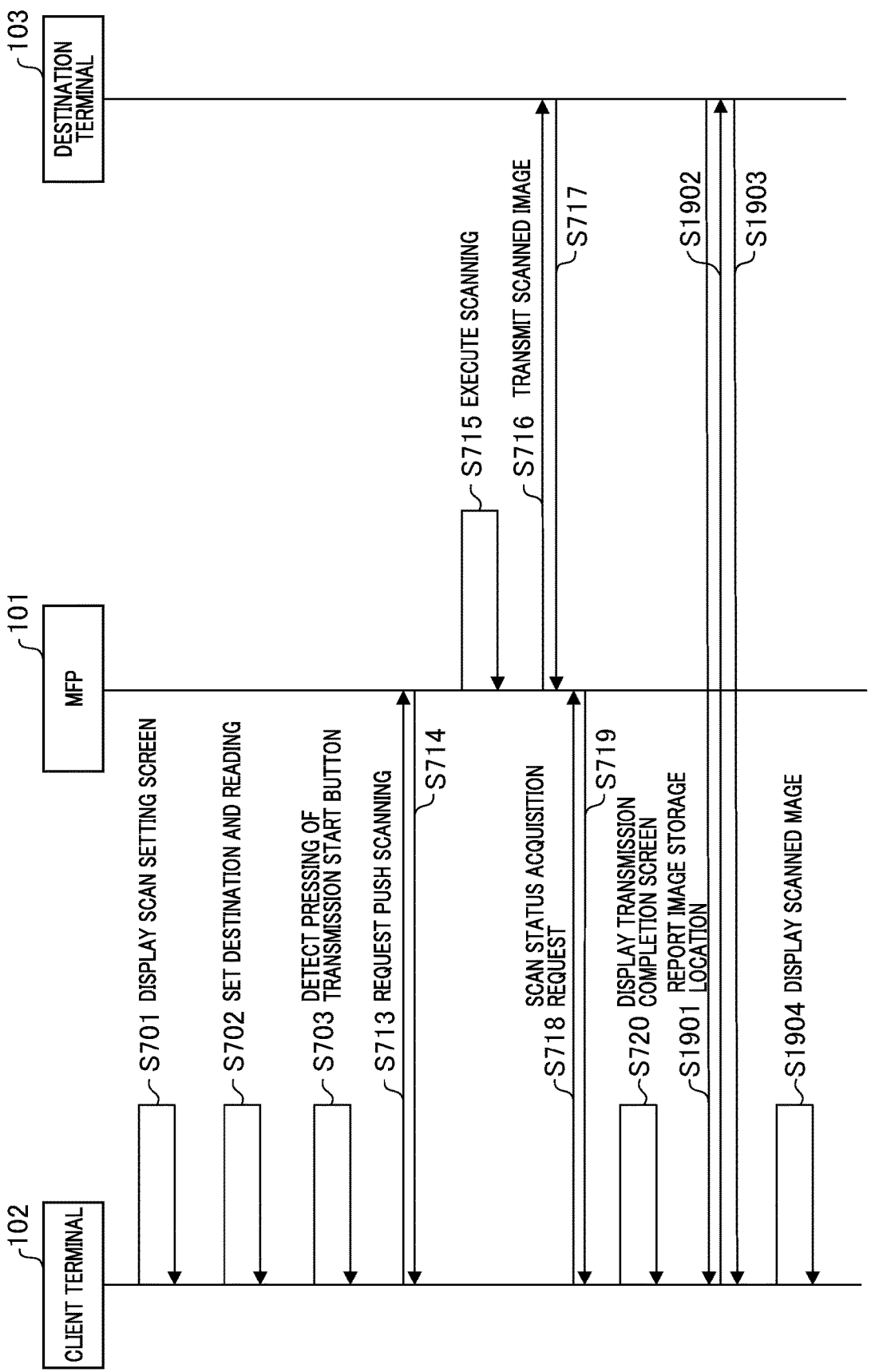
FIG. 19 illustrates a sequence of the scan process according to the third embodiment.

Next, with reference to FIG. 19, a sequence of the push scan processing by the MFP 101, the client terminal 102, and the destination terminal 103 in the present embodiment will be described. The same reference numerals are given to processes that are the same as those in FIG. 7 of the first embodiment, and description thereof will be omitted. In S701, the client terminal 102 displays a scan setting screen on the display unit 306. The scan setting screen displayed at this time is the scan setting screen 1800 shown in FIG. 18.

When the setting is received on the scan setting screen 1800 (S702) and the pressing of the transmission start button 411 is detected (S703), the client terminal 102 requests the MFP 101 for the push scanning in which the destination terminal 103 serves as the destination (S714). The processes from the response to the push scan request (S715) to the display of the transmission completion screen of the scanned image (S720) are the same as that in the first embodiment. The destination terminal 103 that has responded to the transmission of the scanned image in S716, in S717, notifies the client terminal 102 about the storage location of the scanned image in S1901. In S1902 and S1903, the client terminal 102 accesses the storage location of the scanned image on the destination terminal 103 acquired in S1901, and acquires the scanned image. In S1904, the client terminal 102 displays the acquired scanned image.

Figure 20:
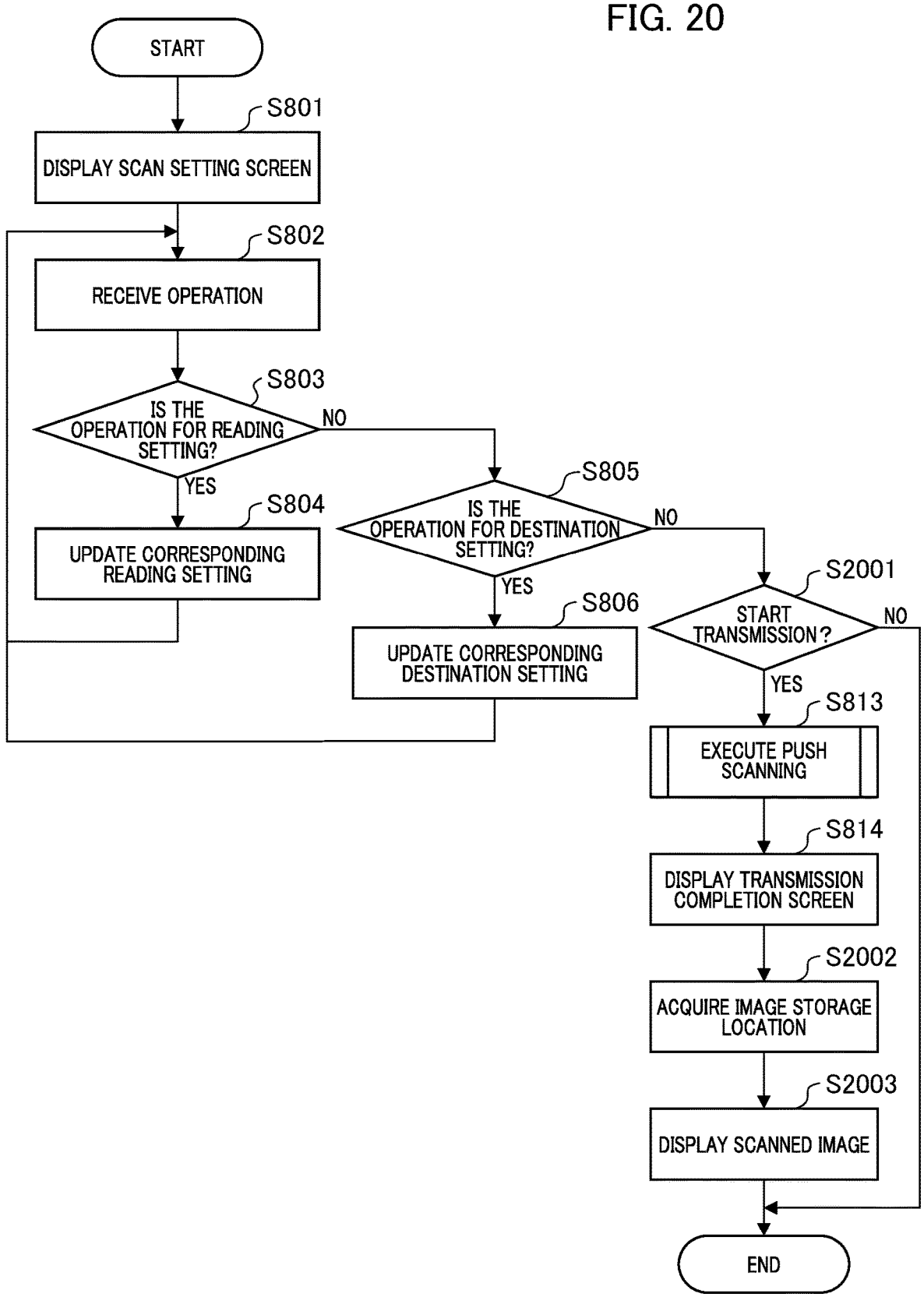
FIG. 20 is a flowchart showing a process of the client terminal according to the third embodiment.

Next, with reference to FIG. 20, a flow process of the client terminal 102 in the present embodiment will be described. FIG. 20 is a flowchart showing the process of the client terminal 102 in the third embodiment. The process of the client terminal 102 in the flowcharts of FIG. 20 is realized by the CPU 301 of the client terminal 102 reading and executing a program stored in the ROM 302, the storage unit 304, or the like. In the present embodiment, it is assumed that HTTP is used for each communication and that the IP address of the MFP 101 is 192.168.1.100. The same processes as those in the first embodiment are denoted by the reference numerals used in FIGS. 7 and 8, the description thereof will be omitted, and only the difference with the first embodiment will be described.

When the operation performed on the scan setting screen 1800 is neither the operation for the read setting nor the operation for the destination setting, in S2001, the setting means 322 of the scan app 320 determines whether or not the operation received in S802 is for the transmission start. When the transmission start button 411 is pressed, the setting means 322 determines that the operation is for the transmission start, and the process proceeds to S813. In contrast, when the cancel button 412 is pressed, the setting means 322 determines that this operation is not for the transmission start and the process ends. In S813, the client terminal 102 requests the push scanning in which the destination terminal 103 serves as the destination to the MFP 101, and causes the MFP 101 to execute the push scanning. The destination terminal 103 acquires the scanned image by the push scanning in S813 and stores it. Subsequently, the destination terminal 103 provides a notification about the storage location of the scanned image to the client terminal 102.

In S2002, the acquisition means 324 of the client terminal 102 receives the notification about the storage location of the scanned image from the destination terminal 103. In S2003, the client terminal 102 accesses the storage location of the scanned image to acquire and display the scanned image. Specifically, the acquisition means 324 of the client terminal 102 accesses the storage location of the scanned image that has been acquired in S2002 and acquires the scanned image. Subsequently, the providing means 321 provides the scanned image to the display means 314, and the display means 314 displays the scanned image on the display unit 306. As a result of the above processes, the user can confirm the scanned image generated by the push scanning.

Next, the process flow of the destination terminal 103 in the present embodiment will be described with reference to FIG. 21. The destination terminal 103 is assumed to have the same configuration as the client terminal 102 shown in FIGS. 3A and 3B. The process of the destination terminal 103 in the flowchart of FIG. 21 is realized by the CPU 301 of the destination terminal 103 reading and executing a program stored in the ROM 302, the storage unit 304, or the like.

In S2101, the acquisition means 324 of the destination terminal 103 receives an image transmission request including the scanned image from the MFP 101 via the network 104 and the communication means 311. The image transmission request includes the information about the destination specified in the destination field 401 of the scan setting screen. Further, the image transmission request may include the authentication information (the username 402 and the password 403) set in the scan setting screen. In S2102, the acquisition means 324 of the destination terminal 103 stores the scanned image included in the image transmission request in the location specified as the destination via the storage means 312. When the storage destination of the scanned image is a location where the authentication is necessary, the authentication information included in the image transmission request is used for the authentication, and the scanned image is stored therein.

In S2103, the transmission means 323 of the destination terminal 103 responds with the image transmission result to the MFP 101, which serves as the request source of the image transmission request in S2101, via the communication means 311 and the network 104. In S2104, the transmission means 323 of the destination terminal 103 determines whether or not the image transmission is successful and the authentication information is included in the image transmission request received in S2101. When the image transmission is successful and the authentication information is included in the image transmission request, the process proceeds to S2105. In contrast, when the image transmission is not successful, or when the authentication information is not included in the image transmission request, the process returns to S2101.

In S2105, the transmission means 323 of the destination terminal 103 provides a notification about the image storage location to the authentication information destination included in the image transmission request received in S2101. The notification is transmitted to, for example, an e-mail address associated with the authentication information. In the present embodiment, the destination terminal 103 provides a notification about the image storage location to the client terminal 102, which serves as the request source of the push scanning. The user who has received the notification about the storage location of the scanned image by the client terminal 102 can acquire the scanned image by accessing the storage location in the notification, and can confirm the scanned image on the display unit 306 by displaying the image. Subsequently, the process proceeds to S2101.

Although, in S2105, the example of specifying the request source of the scan from the authentication information included in the image transmission request and providing the notification about the image storage location has been described, the image transmission request may include a notification destination and the destination terminal 103 may provide a notification about the image storage location to the notification destination. The notification destination may or may not be the request source of the pull scanning. Additionally, the client terminal 102 may request the destination terminal 103 to acquire the scanned image after the completion of the push scanning, and the acquired scanned image may be displayed on the display unit 306.

As described above, according to the present embodiment, the user can immediately confirm the scanned image that has been transmitted to the destination of the push scanning after providing an instruction for the push scanning to the image processing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-047077, filed Mar. 22, 2021, which is hereby incorporated by reference wherein in its entirety.

What is claimed is:

1. An information processing apparatus that executes an application that can transmit both push scanning and pull scanning instructions to a scanner apparatus comprising:
at least one memory storing instructions; and
one or more processors configured to execute the instructions, which when executed by the one or more processors, cause the information processing apparatus to:
acquire an image to be used for a preview from the scanner apparatus by providing an instruction for pull scanning to the scanner apparatus if an input of a setting for performing a push scanning is received and a preview setting is further received;
provide a preview screen by using the acquired image to be used for a preview; and
transmit a push scanning instruction to the scanner apparatus according to the received input of the setting for performing a push scanning in response to the receipt of an operation for starting the push scanning after the preview screen is provided.

2. The information processing apparatus according to claim 1, wherein the push scanning instruction includes the specification of a transmission destination to which an image scanned by the scanner apparatus is transmitted and data related to authentication at the transmission destination.

3. The information processing apparatus according to claim 1, wherein a read setting included in the pull scanning instruction is a reading setting that has been received by the input of the setting for performing the push scanning.

4. The information processing apparatus according to claim 1, wherein if the input of the setting for performing a push scanning is received and the preview setting is further received, in the acquiring, an image to be used for a preview is acquired from the scanner apparatus by instructing the scanner apparatus to perform the push scanning in which the scanner apparatus itself serves as the transmission destination.

5. The information processing apparatus according to claim 1, wherein an information processing apparatus at the transmission destination that has acquired the image scanned in response to the push scanning instruction from the scanner apparatus notifies the information processing apparatus that has transmitted the push scanning instruction about a storage location of the image and acquires the image from the storage location about which notification has been provided.

6. A scanner apparatus comprising:
at least one memory storing instructions; and one or more processors configured to execute the instructions, which when executed by the one or more processors, cause the scanner apparatus to:

receive a scanning instruction from an information processing apparatus;

generate an image by executing scanning in response to the scanning instructions; and transmit the image generated by scanning, wherein, during the transmission, if a pull scanning instruction is received from the information processing apparatus, the image is transmitted to the information processing apparatus that has transmitted the pull scanning instruction, and if a push scanning instruction is received from the information processing apparatus, the image is transmitted to a transmission destination specified in the push scanning instruction.

7. The scanner apparatus according to claim 6, wherein, during the transmission, data related to authentication at the transmission destination included in the push scanning instruction is transmitted together with the image during transmission of the image generated by the scanning in response to the push scanning instruction to the specified transmission destination.

8. A control method of an information processing apparatus that executes an application that can transmit both push scanning and pull scanning instructions to a scanner apparatus, the method comprising:

acquiring an image to be used for a preview from the scanner apparatus by providing an instruction for pull scanning to the scanner apparatus if an input of a setting for performing a push scanning is received and a preview setting is further received;

providing a preview screen by using the acquired image to be used for a preview; and transmitting a push scanning instruction to the scanner apparatus according to the received input of the setting for performing the push scanning in response to the receipt of an operation for starting the push scanning after the preview screen is provided.

9. A control method of a scanner apparatus, the method comprising:

receiving a scanning instruction from an information processing apparatus;

generating an image by executing scanning in response to the scanning instruction; and transmitting the image generated by scanning, wherein, in the transmitting, if a pull scanning instruction is received from the information processing apparatus, the image is transmitted to the information processing apparatus that has transmitted the pull scanning instruction, and if a push scanning instruction is received from the information processing apparatus, the image is transmitted to a transmission destination specified in the push scanning instruction.

10. A non-transitory storage medium on which is stored a computer program for causing a computer of an information processing apparatus that executes an application that can transmit both push scanning and pull scanning instructions to a scanner apparatus to execute a control method, the method comprising:

acquiring an image to be used for a preview from the scanner apparatus by providing an instruction for pull scanning to the scanner apparatus if an input of a setting for performing a push scanning is received and a preview setting is further received;

providing a preview screen by using the acquired image to be used for a preview; and transmitting a push scanning instruction to the scanner apparatus according to the received input of the setting for performing the push scanning in response to the receipt of an operation for starting the push scanning after the preview screen is provided.

11. A non-transitory storage medium on which is stored a computer program for causing a computer of a scanner apparatus to execute a control method, the method comprising:

receiving a scanning instruction from an information processing apparatus;

generating an image by executing scanning in response to the scanning instruction; and transmitting the image generated by scanning, wherein, in the transmitting, if a pull scanning instruction is received from the information processing apparatus, the image is transmitted to the information processing apparatus that has transmitted the pull scanning instruction, and if a push scanning instruction is received from the information processing apparatus, the image is transmitted to a transmission destination specified in the push scanning instruction.

\* \* \* \* \*